United States Patent [19]

Takada et al.

[11] Patent Number: 5,610,639

[45] Date of Patent: Mar. 11, 1997

[54] IMAGE FORMING APPARATUS WITH A CORRECTION RECORDING CONDITION FEATURE AND RELATED METHOD

[75] Inventors: Yoshihiro Takada, Kawasaki; Nobuyuki Watanabe; Kiyohisa Sugishima, both of Yokohama; Keiju Kuboki, Kawasaki, all of Japan

[73] Assignee: Canon Kabushiki Kaisha, Tokyo, Japan

[21] Appl. No.: 209,374

[22] Filed: Mar. 14, 1994

Related U.S. Application Data

[63] Continuation of Ser. No. 908,786, Jul. 6, 1992, which is a continuation of Ser. No. 480,041, Feb. 14, 1990, abandoned.

[30] Foreign Application Priority Data

Feb. 14, 1989 [JP] Japan ........................ 1-032745
Feb. 14, 1989 [JP] Japan ........................ 1-032746
Feb. 14, 1989 [JP] Japan ........................ 1-035351

[51] Int. Cl.$^6$ ............................................. B41J 2/21
[52] U.S. Cl. ........................... 347/19; 347/43; 358/502; 358/504
[58] Field of Search .................. 347/19, 14, 43, 347/5; 358/502, 504, 523, 524, 527, 406; 355/202

[56] References Cited

U.S. PATENT DOCUMENTS

| | | | |
|---|---|---|---|
| 4,533,928 | 8/1985 | Sugiura | 347/43 |
| 4,639,770 | 1/1987 | Jung | 358/80 X |
| 4,668,978 | 5/1987 | Gokita | 358/501 |
| 4,675,696 | 6/1987 | Suzuki | 347/19 X |
| 4,692,778 | 9/1987 | Yoshimura | 347/108 |
| 4,723,129 | 2/1988 | Endo et al. | 347/56 |
| 4,740,814 | 4/1988 | Folkins | 355/202 |
| 4,769,653 | 9/1988 | Shimoda | 347/14 |
| 4,769,696 | 9/1988 | Utsuda | 358/527 |
| 4,827,279 | 5/1989 | Lubinsky | 347/188 |
| 4,829,323 | 5/1989 | Suzuki et al. | 347/43 |
| 4,855,765 | 8/1989 | Suzuki et al. | 358/80 X |
| 4,878,063 | 10/1989 | Katerberg | 347/19 |
| 4,882,621 | 11/1989 | Suzuki et al. | 358/80 |
| 4,908,635 | 3/1990 | Iwasawa | 347/19 X |
| 4,975,780 | 12/1990 | Kuboki | 347/43 |
| 5,038,208 | 8/1991 | Ichikawa | 347/19 |
| 5,157,411 | 10/1992 | Takekoshi | 347/13 |

FOREIGN PATENT DOCUMENTS 54-059936 5/1979 Japan .................. B41J 3/04

*Primary Examiner*—Joseph W. Hartary
*Attorney, Agent, or Firm*—Fitzpatrick, Cella, Harper & Scinto

[57] ABSTRACT

An image forming apparatus having plural dot recording elements including a correction circuit for correcting each of the recording conditions of the recording elements, display means for displaying corrections by said correcting means; input key for changing the corrections by said correcting circuit and a controller for performing the recording operation of a predetermined pattern with the amounts of correction changed.

34 Claims, 15 Drawing Sheets

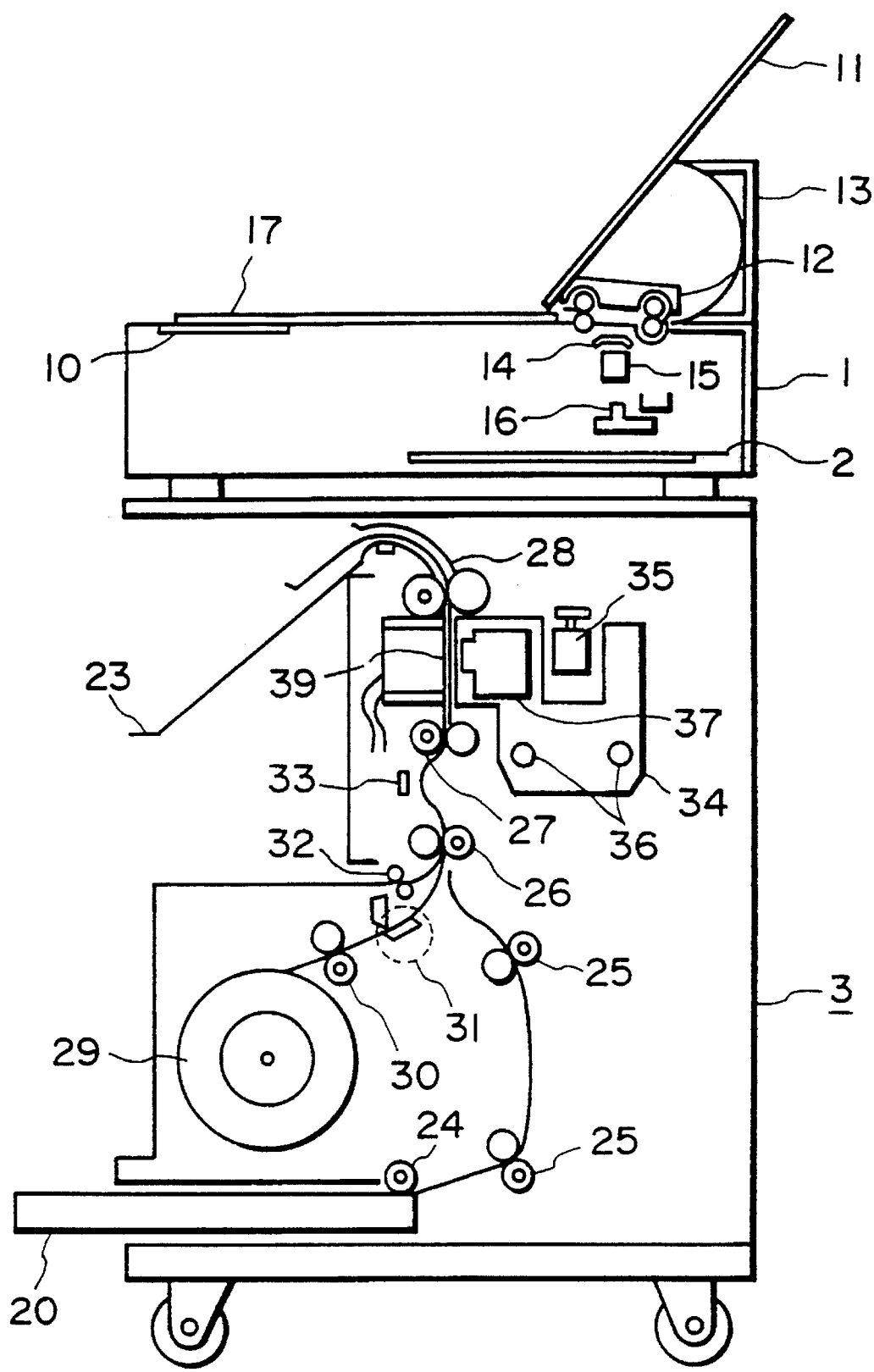
F I G. 1

IMAGE FORMING APPARATUS WITH A CORRECTION RECORDING CONDITION FEATURE AND RELATED METHOD

This application is a continuation of application Ser. No. 07/908,786 filed on Jul. 6, 1992, which is a continuation of application Ser. No. 07/480,041 filed on Feb. 14, 1990, now abandoned.

FIELD OF THE INVENTION AND RELATED ART

The present invention relates to an image forming apparatus for forming an image using a recording head having multiple dot recording elements.

In an example of conventional apparatus of this type, an image is read, and the read image is converted to digital signals, which are then processed so that the image is recorded using a recording head having multiple dot recording elements in accordance with the processed data. Such an apparatus is not completely free from the problem that the density of the output image is not uniform due to manufacturing variation of the recording head and/or due to the variation in the materials constituting the recording head. U.S. Ser. No. 271,299 filed on Nov. 15, 1988, now U.S. Pat. No. 5,038,208, assigned to the assignee of this application has proposed that the apparatus is provided with memory means for storing data in accordance with output properties of the individual dot recording elements of the head and means for correcting the input image data in accordance with the stored data to prevent the occurrence of the non-uniform density.

However, in this proposal the correcting data is stored in the memory (ROM) in accordance with the output properties inherent to the recording elements, and therefore, when, for example, the output properties of the dot recording elements changes due to change in the ambient conditions or due to long term use thereof, the recording head has to be exchanged, or the memory (ROM) has to be produced again. This would result in the difficulty in maintaining the image quality after the apparatus is sold and the cost for exchanging parts increases.

SUMMARY OF THE INVENTION

Accordingly, it is a principal object of the present invention to provide an image forming apparatus wherein the image quality can be maintained even when the properties of dot recording elements change.

It is another object of the present invention to provide an image forming apparatus wherein color imbalance or density non-uniformness can be corrected by easy operation. According to an aspect of the present invention, there is provided an image forming apparatus including correcting means for correcting recording parameters for the dot recording elements constituting a recording head for image formation, display means for displaying the correction provided by the correcting means; input means for changing the correction by the correcting means and means for performing recording operation of a predetermined pattern by the recording head in accordance with the correction changed by said input means.

It is a further object of the present invention to provide an image forming apparatus wherein an operator can easily recognize the corrected state of the density non-uniformness.

It is a further object of the present invention to provide an image forming apparatus wherein the corrected state in the density non-uniformness or color imbalance can be known for individual colors.

It is a further object of the present invention to provide an image forming apparatus in which the image density non-uniformness or the color imbalance can be easily corrected.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a sectional view of a digital color copying apparatus according to an embodiment of the present invention.

DESCRIPTION OF THE PREFERRED EMBODIMENT

Figure 2:
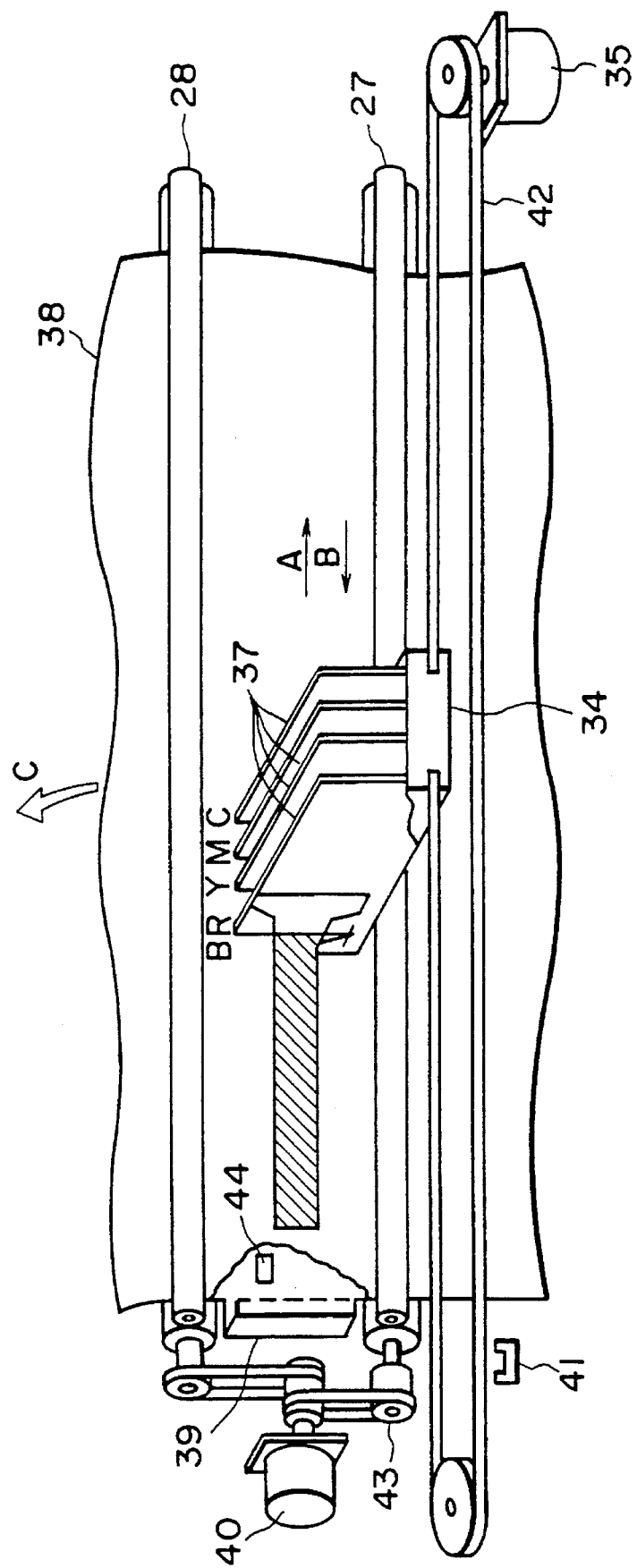
FIG. 2 shows details of a scanning carriage.

The preferred embodiments of the present invention will be described in detail in conjunction with the accompanying drawing. In the embodiments, an image forming apparatus of an ink jet recording type is taken as exemplary. In the ink jet recording apparatus taken here, a recording head is provided with multiple nozzles (dot recording elements) for ejecting ink.

[General Description]

Referring to FIG. 1, there is shown a cross-sectional view of a digital color copying apparatus according to an embodiment of the present invention.

The apparatus is generally divided into two parts. A color image scanner is disposed at a top side of the apparatus to read the original image and produce digital color image data, and a controller 2 is contained in the scanner 1 to perform various image processing of the digital color image data and having interface with an external apparatus.

The scanner 1 reads a three-dimensional or sheet original placed face down on a platen below an original cover 11. It is provided with a mechanism 12 for reading a large size sheet original.

An operating station 10 is connected with the controller 2, wherein various instructions for the copying apparatus are input. The controller 2 controls operations of the scanner I and a printer 3 in accordance with the input instructions. When a more complicated adding process or the like is desired, a digitizer or the like is used in place of the original cover 11, and is connected with the controller 2 to permit more complicated image-processing.

The bottom part of the image forming apparatus provides the printer 3 for recording the color digital image signal produced by the controller 2 on a recording sheet. In this embodiment, the printer 3 is of such a type as is disclosed in Japanese Laid-Open Patent Application No. 59936/1979 (ink jet recording type) wherein the liquid is ejected by an application of thermal energy imparting film boiling. In this embodiment, it is a full-color printer.

The above-described two parts are separable, and therefore, they may be disposed at remote positions using a long connecting cable.

In operation, an image of a original placed on an original supporting platen glass 17 or a sheet original fed by a sheet feeding mechanism 12 is read by an exposure lamp 14, a lens 15 and an image sensor 16 (CCD in this embodiment) capable of reading a line of an image in full-color. Then, the scanner 1 and the controller 2 carry out various image-processing, and then, the printer 3 records the image on the recording paper.

In FIG. 1, the recording paper 1 is in the form of cut sheets accommodated in a sheet cassette 20 having a relatively smaller size (A4–A3, in this embodiment) or it is in the form of a roll of paper 29 having a relatively large size (A2–A1, in this embodiment).

A cover 21 of the sheet feed station is constituted as a manual sheet feeding tray by which sheets can be manually fed one by one manually.

A pick-up roller 24 picks one sheet up from the cassette 20. The cut sheet picked up by the roller 24 is conveyed to a first sheet conveying roller 26 by a cut sheet conveying roller 25.

The rolled sheet 29 is fed out by a rolled sheet feeding roller 30, and is cut into a desired predetermined length by a cutter 31 and is conveyed to the first feeding roller 26.

Similarly, the recording sheet supplied from the manual feed tray 22 is conveyed to the first feeding roller 26 by a manual feeding roller 32.

The pick-up roller 24, the cut sheet feeding roller 25, the rolled sheet feeding roller 30, the first feeding roller 26 and the manual feeding roller 32 are driven by an unshown feeding motor (a DC servo motor in this embodiment), and are on-off controlled by an electromagnetic clutches associated with the respective rollers.

When the printing operation is started in response to the instructions from the controller 2, the recording sheet selectively fed from one of the sheet feeding paths is conveyed to the first feeding roller 26. In order to prevent oblique conveyance of the paper, a predetermined amount of loop of the paper is formed by stopping by the first feeding roller 26, and then it is fed to the second feeding roller 27.

During the printing operation by the recording head 37, a scanning carriage 34 on which the recording head 37 or the like is mounted reciprocates by a scanning motor 35 on a carriage rail 36. In the forward stroke of the reciprocation, the image is printed on the recording paper, and in the backward stroke, the recording sheet is advanced by a predetermined increment by a paper feeding roller 28. The recording paper on which the image is printed is discharged onto a discharge tray 23, thus completing the printing operation.

Referring to FIG. 2, the scanning carriage 34 will be described in detail.

A paper feeding motor 40 is a driving source for intermittently feeding the recording paper, and it drives the second feeding roller 27 through a paper feeding roller 28, the second roller and the clutch 43.

The scanning motor 35 is a driving source for scanningly driving the scanning carriage 34 through a scanning belt 42 in directions A and B. In this embodiment, the paper feeding motor 40 and the scanning motor 35 are in the form of a pulse motor, because correct paper feeding control is desired.

When the recording paper reaches the second feeding roller 27, the second roller, the clutch 43 and the paper feeding motor 40 is actuated, by which the recording paper is conveyed on the platen 39 to the paper feeding roller 28.

The recording paper is detected by a paper recording sensor 44 mounted on the platen 39, and the output of the sensor is used for position control and jam clearance.

When the recording paper reaches the paper feeding roller 28, the second roller clutch 43 and the paper feeding motor 40 is deenergized, and then, the recording paper is attracted onto the platen 39 by an unshown sucking motor from an inside of the platen.

Prior to the image recording operation on the recording paper, the scanning carriage 34 is moved to the home position sensor 41, and then, it is moved in the direction A for the forward scanning. From a predetermined position, the recording head 37 ejects droplets of cyan, magenta, yellow and black ink to perform the image recording. After a predetermined length of recording operation is completed, the scanning carriage 34 is stopped, and it is moved in the backward direction, that is, direction B, so that the scanning carriage 34 is returned to the home position sensor 41. During the backward stroke, the paper is fed through a length equal to the length in which the recording head 34 records by the paper feeding roller 28 driven by the paper feeding motor 40 in a direction C.

In this embodiment, the recording head 37 is such that a bubble is formed by heat, and the pressure resulting therefrom is effective to eject a droplet of ink. Four assemblies each having 256 nozzles are used.

When the scanning carriage 34 stops at its home position where it is detected by the home position sensor 41, the recording head recovering operation is performed. This is a processing for stably executing the recording operation. In the recovery operation, pressure is applied to the recording head 37, or the ink is ejected idly, in accordance with programmed conditions determined in accordance with paper feeding time, temperature in the apparatus, ejecting time or the like in order to prevent non-uniform ejection at the initial stage of the ejecting operation attributable to the variation in the viscosity or the like of the ink remaining in the nozzle of the recording head.

By repeating the above described operation, the entire surface of the recording paper is subjected to the image recording operation.

[Scanner]

Figure 3:
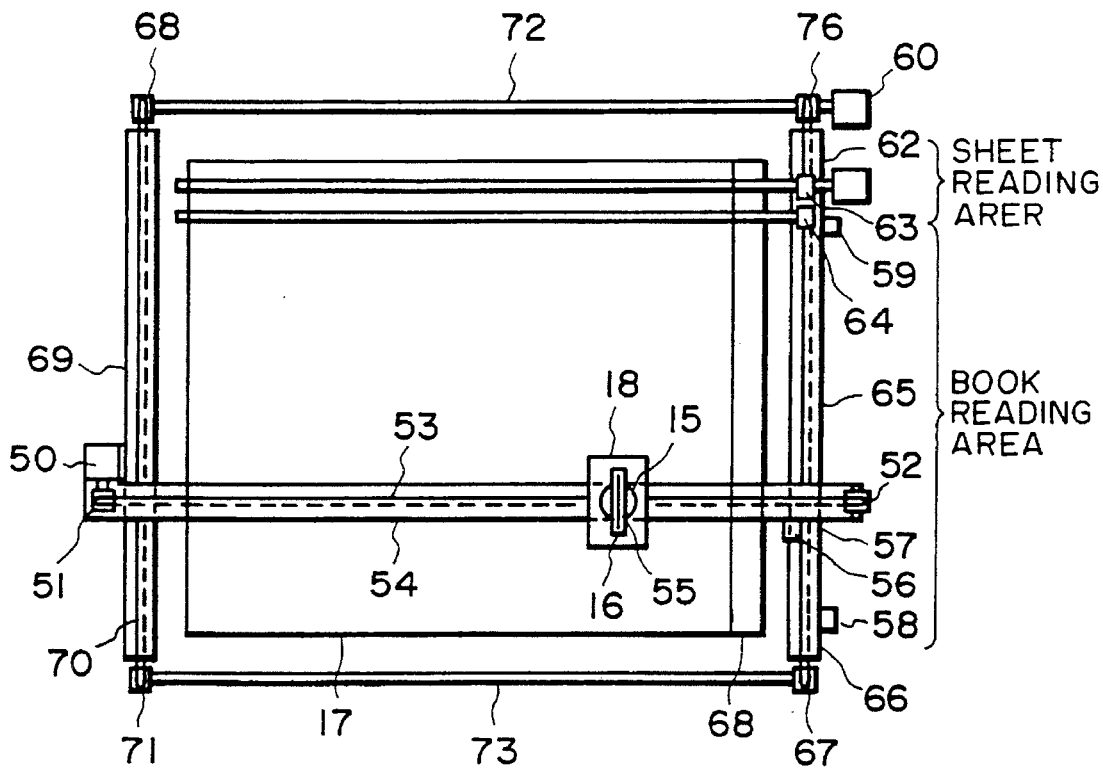
FIG. 3 is a top plan view of an inside of a scanner.
Figure 4:
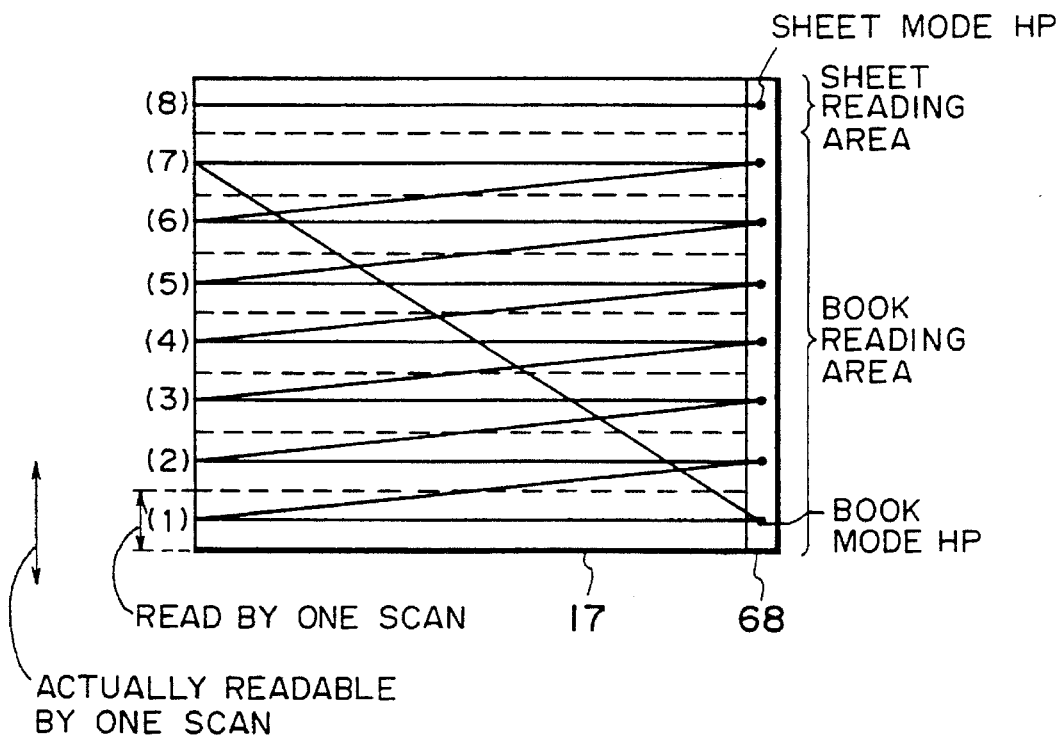
FIG. 4 illustrates a reading operation of the scanner.

Referring to FIGS. 3 and 4, the description will be made as to the scanner 1. FIG. 3 illustrates the mechanism in the scanner.

A CCD unit 18 is constituted by CCD 16, a lens 15 or the like and is moved on a rail 54 by a main scan direction driving system including a main scan motor 50 fixed on the rail 54, a Pulley 51, a pulley 52 and a wire 53, so as to read the image of the original on the original supporting glass 17 in the main scanning direction. A light blocking plate 55 and the home position sensor 56 used for the position control when the CCD unit 18 is moved to the main scan home position in a correction area 68 in the Figure.

The rail 54 is on the rails 65 and 65 and is moved by a sub-scan driving system including a sub-scan motor 60, pulleys 67, 68, 71 and 76, shafts 72 and 73 and wires 66 and 70. A light blocking plate 57, home position sensors 58, 59 are used when the rail 54 is moved to the sub-scan home positions in a book mode in which a book original or the like on the platen 17 is read and in a sheet mode in which a sheet original is read, respectively.

The sheet feeding motor, the sheet feeding rollers, the pulleys and the wire constitute a mechanism for feeding the sheet original. This mechanism is disposed on the original supporting platen glass 17, and functions to advance the sheet original placed face down on the platen glass 17 by a predetermined amount at a time by sheet feeding rollers.

FIG. 4 illustrates an original reading operation in the book mode and the sheet mode.

In the book mode, the CCD unit 18 is moved to the book mode home position (book mode HP) in the correction area 68, and from this position, the reading operation of the entire surface of the original plate on the platen 17 is started.

Prior to the scanning of the original, the necessary data setting, such as shading correction, black level correction, color balance correction or the like, is carried out in the correction area 68. Thereafter, the scanning operation in the main-scan direction starts in the direction indicated by an arrow by a scanning mode 50. After the area leading operation (1) is completed, the main scanning motor 51 is reversed, and the sub-scanning motor 60 is driven to move it in the correction area 68 in the sub-scan direction. Then, similarly to the main scan in the area (1), the shading correction, the black level correction, the color balance correction or the like are carried out as desired, and the area (2) is read.

By repeating the above scanning operation, the areas (1)–(7) are read entirely. After the area (7) is read, the CCD unit 18 is returned to the book mode home position.

The apparatus of this embodiment is capable of reading an any size original at maximum, and therefore, a greater number of scanning operations have to be repeated, but they are omitted for the sake of simplicity of explanation.

In the sheet mode, the CCD unit 18 is moved to the shown sheet mode home position (sheet mode HP), and the area (8) is repeatedly read while the sheet original is intermittently advanced by the sheet feeding motor 61, so that the entire sheet original is read.

Prior to the scanning of the original, the shading correction, the black level correction. Color correction or the like are performed by reading reference colors on the correction area 68, and thereafter, the scanning operation in the main-scan is started by the main-scan motor 50 in the direction indicated by an arrow. After the reading operation for the area (8) in the forward stroke, the main-scan motor 50 is reversed. During the returning stroke, the sheet feeding motor 61 is driven to advance the sheet original by a predetermined distance in the sub-scan direction. The same operation is repeated to read the entire sheet original.

If the above reading operation is a one-to-one reading, the area read by the CCD unit 18 is an actually broad area as shown in FIG. 4. This is because the digital color copying machine of this embodiment has a variable magnification function for enlargement and reduction. More particularly, as described in the foregoing, the area covered by one scan of the recording head 37 is fixedly 256 bits, and therefore, when the reduction copy of 50% is to be performed, the image information in the double area, i.e., 512 bits at minimum is required. Therefore, the scanner 1 has a function of reading and outputting in a given image area by one scan.

[Function Block]

Figure 5:
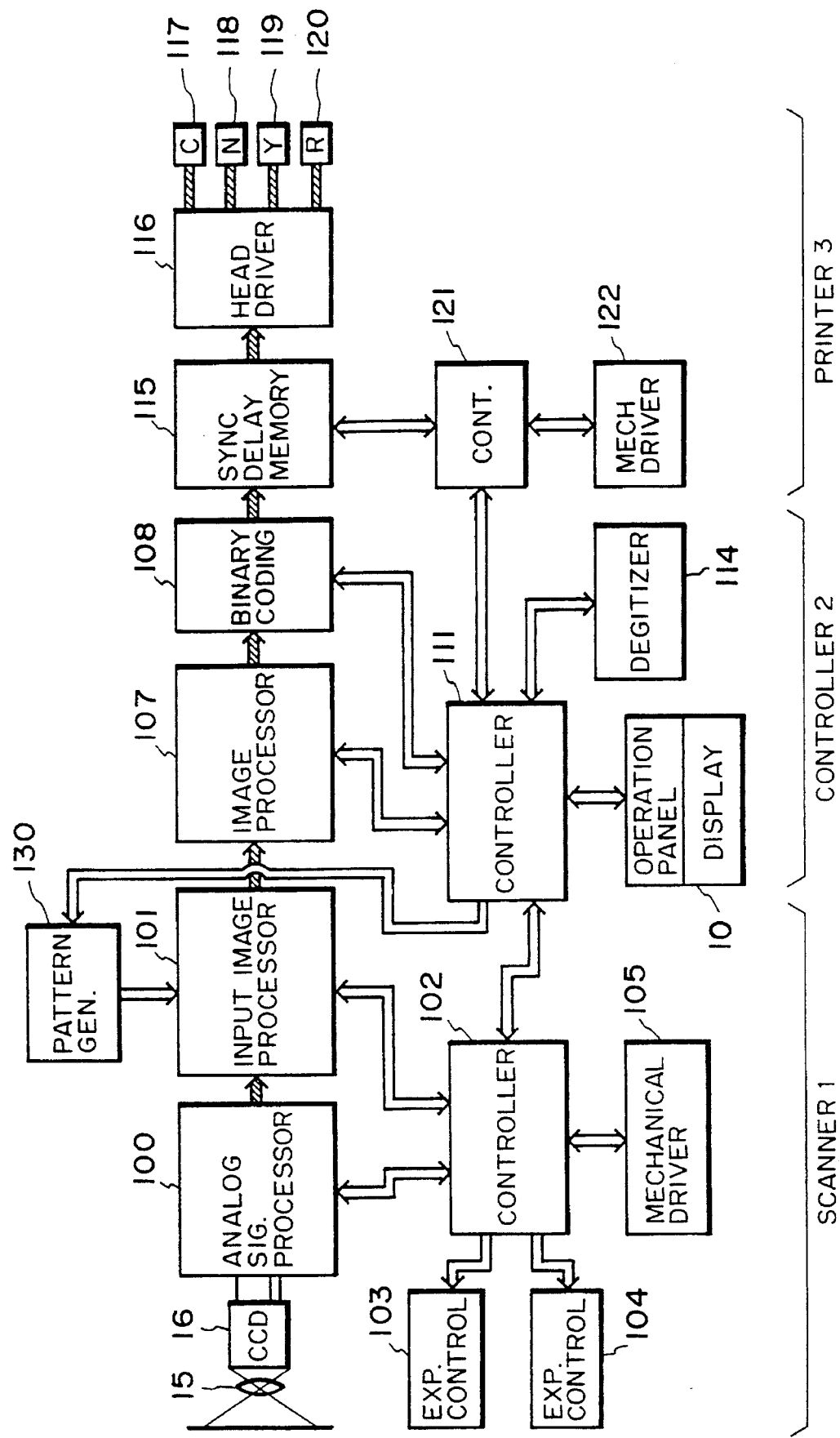
FIG. 5 is a block diagram of a control system of the digital color copying apparatus according to an embodiment of the present invention.

Referring to FIG. 5, the function block for the digital color copying machine according to this embodiment will be described.

Controllers 102, 111 and 121 control the scanner 1, the controller portion 2 and the printer 3, respectively. They are constituted by a microcomputer or computers, program ROM, data memory and communication circuits and others. The controllers 102 and 111 are connected by communication wiring, and the controllers 111 and 121 are connected by communication wiring. The control system is a so-called master-slave type wherein the controllers 102 and 121 are controlled by the controller 111.

The controller 111 is controlled in accordance with the input to the operation panel 10 and to the digitizer 114, when the apparatus operates as a color copying machine.

The digitizer 114 receives information required for the trimming and masking operation. The digitizer 114 is optionally provided in consideration of the requirement for a complicated copying or editing operation.

The controller 102 controls the mechanical driver 105 for mechanically driving the scanner 1 and controls an exposure controller 103 for controlling the exposure operation by the lamp when the original is read using reflected light. The controller 102 also controls an analog signal processor 100 for performing various process for the image and the input image processor 101.

The controller 121 controls the mechanical driver 122 for controlling the mechanical driving for the printer 3 and also controls synchronization and delay memory 115 for absorbing time variations in the mechanical operation of the printer 3 and correction of the delay due to the mechanical structure of the recording head assemblies 117–120.

Referring to FIG. 5, the image processing block will be described along the flow of the image forming operation. The image formed on the CCD 16 is converted to analog electric signals by the CCD 16. The converted image information is processed serially in the order, for example, of red, green and blue, and it is supplied to the analog signal processor 100. The analog signal processor 100 performs a sampling and holding operation, a dark level correction and a dynamic range control or the like for red, green and blue colors, respectively, and thereafter performs an analog-digital conversion (A/D conversion), by which serial multi-level (8 bit length for each color in this embodiment) digital signals of an image is produced and is supplied to the input image processor 101.

The input image processor 101 performs correcting operations required in the reading system such as a CCD shading correction and γ correction or the like to the serial multi-level digital image signals, and Y, M and C signals are produced.

The image processor 107 carries out a smoothing process, edge enhancing process, black extraction process and a masking process for color correction for the recording ink used with the recording heads 117–120. The serial multi-level digital image signals are supplied to the binary code processor 108.

The binary processor 108 function to convert the serial multi-level digital signals of image to binary signals, and selectively performs simple bi-level processing on the basis of a fixed slice level or a half-tone like processing on the basis of a dither method. Here, the serial multi-level digital signals are converted to bi-level parallel image signals for four colors.

A synchronization and delay memory 115 of the printer 3 is effective to absorb the time variation in the mechanical operation of the printer 3 and to correct mechanical delay of the recording heads 117–120. In the memory, the timing required for driving the recording heads 117–120 is produced. A head driver 116 is an analog driving circuit for driving the recording heads 117–120 and produces therein a signal for directly driving the recording head 117–210.

The recording heads 117–120 eject cyan, magenta, yellow and black ink droplets, respectively so as to record an image on the recording paper.

Figure 6:
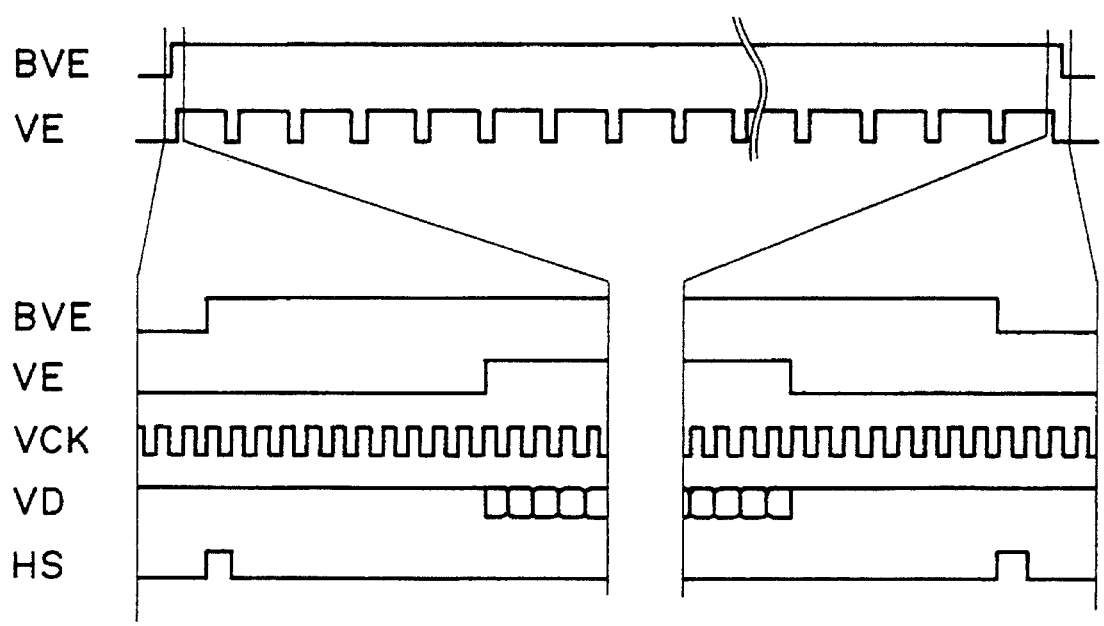
FIG. 6 illustrates image information timing between circuit blocks.

FIG. 6 illustrates the image timing among the circuit blocks.

A signal BVE is a signal indicative of an image effective interval for each of scanning operations in the main scanning direction explained in conjunction with FIG. 4. By outputting the signal BVE a plurality of times, the image of the entire image surface is outputted.

A signal VE is a signal indicative of an image effective interval for each one line read by the CCD 16. The finally effective signal is only the signal VE during the period in which the signal BVE is effective.

A signal VCK is a clock signal for supplying the image data VD. The signal BVE and the signal VE change in synchronization with the signal VCK.

A signal HS is a signal to be used in the case that the signal VE repeats intermittently the effective and ineffective states during one line output. It is not required when the signal VE is continuously at the effective state during the one line output. The timing at which the signal HS is high level is the timing of the start of the one line image output.

Figure 7:
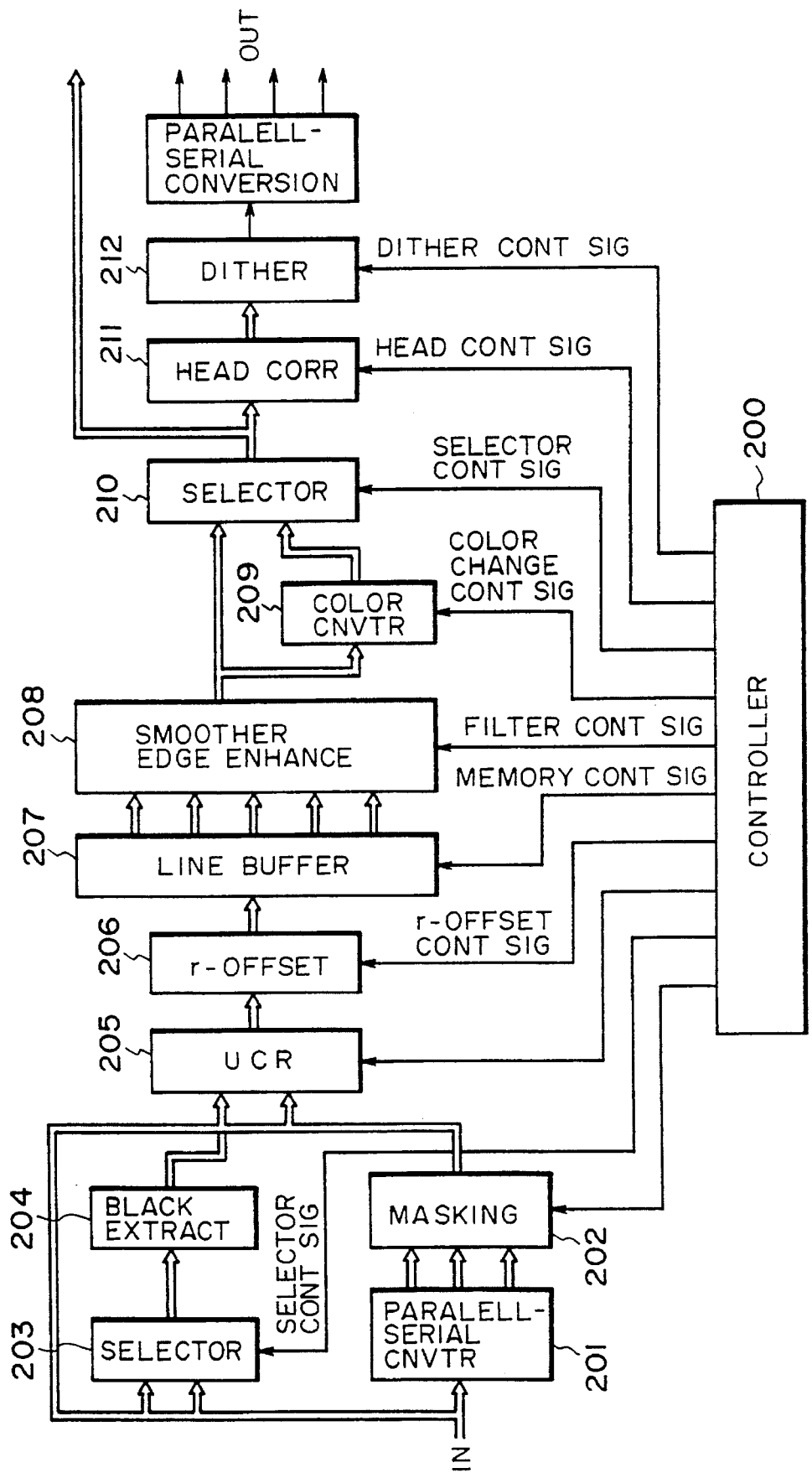
FIG. 7 is a block diagram of a color image processing apparatus.

Referring to FIG. 7, the general description will be made as to the signal processing by the image processor.

The Y, M and C image data serially inputted to the image processor 107 are supplied to a serial-parallel converter 201, where they are converted to Y (yellow), M (magenta) and C (cyan) parallel signals, and then are transmitted to the masking processor 202 and the selector 203.

In the masking processor 202 in order to correct the mixture of the output ink, the following processing is carried out:

$$\begin{pmatrix} Y' \\ M' \\ C' \end{pmatrix} = \begin{pmatrix} a11 & a12 & a13 \\ a21 & a22 & a33 \\ a31 & a32 & a33 \end{pmatrix} \begin{pmatrix} Y \\ M \\ C \end{pmatrix}$$

Y, M, C: INPUT DATA
Y', M', C': OUTPUT DATA

The nine coefficients are determined in response to a masking control signal from the controller 200. After the mixture of the ink is corrected by the masking processor 202, the signals in the form of serial signals are supplied to the selector 203 and UCR 205. The selector 203 receives input image data and image data produced by the masking processor 202.

The selector 203 selects the input image data in accordance with a selector controlling signal 1 supplied normally from the controller 200. When the color correction is not sufficiently carried out in the input system, the image data of the masking processor 202 output are selected by the control signal 1 and are outputted. The serial image data supplied from the selector 203 are inputted into a black extractor 204. Then, the levels of Y, M and C signals are deducted as a block, the levels being determined to be the minimum of the Y, M and C levels. The detected black data are supplied to the UCR 205.

In the UCR 205, the black datum extracted from each of Y, M and C signals is deducted. The black datum is multiplied by a proper coefficient. The black datum supplied to the UCR 205 is subjected to correcting operation for correcting the time lag in relation to the image data supplied from the masking processor 202, and thereafter, the following processing is carried out:

$Y'=Y-a_1 Bk$ $M'=M-a_2 Bk$ $C'=C-a_3 Bk$ $Bk'=a_4 Bk$ where Y, M, C and Bk are input data to the extractor, and Y', M', C' and Bk' are output data of the extractor. The coefficients $a_1$, $a_2$, $a_3$ and $a_4$ are determined in accordance with the UCR control signal supplied from the controller 200.

The data produced by the UCR 205 are supplied to a γ and offset processor 206, wherein the following tone correction is performed:

$Y'=b_1 (Y-C_1)$ $M'=b_2 (M-C_2)$ $C'=b_3 (C-C_3)$ $Bk'=b_4 (Bk-C_4)$

Here, Y, M, C and Bk are input data to the γ and offset processor, and Y', M', C' and Bk' are output data of the Y and offset processor.

The coefficients $b_1$–$b_4$ and $C_1$–$C_4$ are determined in accordance with γ and offset control signal supplied from the controller 200.

The signal having been subjected to tone correction by the γ and offset processor 206 is supplied to a line buffer 207 for memorizing N lines image data. The line buffer 207 produces in the form of 5 line parallel signals 5 line data required for the subsequently smoothing and edge enhancing process by the processor 208 in accordance with a memory control signal supplied from the controller 200. The 5 line signals are supplied to a spatial filter having a variable filtering size in accordance with a filter control signal from the controller 200, and are subjected to the smoothing and thereafter edge enhancing process.

The image datum produced by the smoothing and edge enhancing processor 208 is supplied to a color converter 209 and is color-converted in accordance with a color conversion control signal from the controller 200. By the digitizer 114 of FIG. 5, the color which is to be converted and the color to which it is converted, and the region where the signal is effective are preset. In accordance with the preset data, the color conversion processor 209 replaces the image data. In this embodiment, the detailed description of the color conversion processor 209 is omitted for simplicity. The image signal produced by the smoothing and edge enhancing processor 208 and the image signal after the color conversion are supplied to the selector 210 which selects the image data to be outputted in accordance with the selector controller signal 2. The selection of the image data is determined by designating the effective area preset by the digitizer 114.

The image signal selected by the selector 210 is supplied to the binary code processor 108 shown in FIG. 5.

Figure 8:
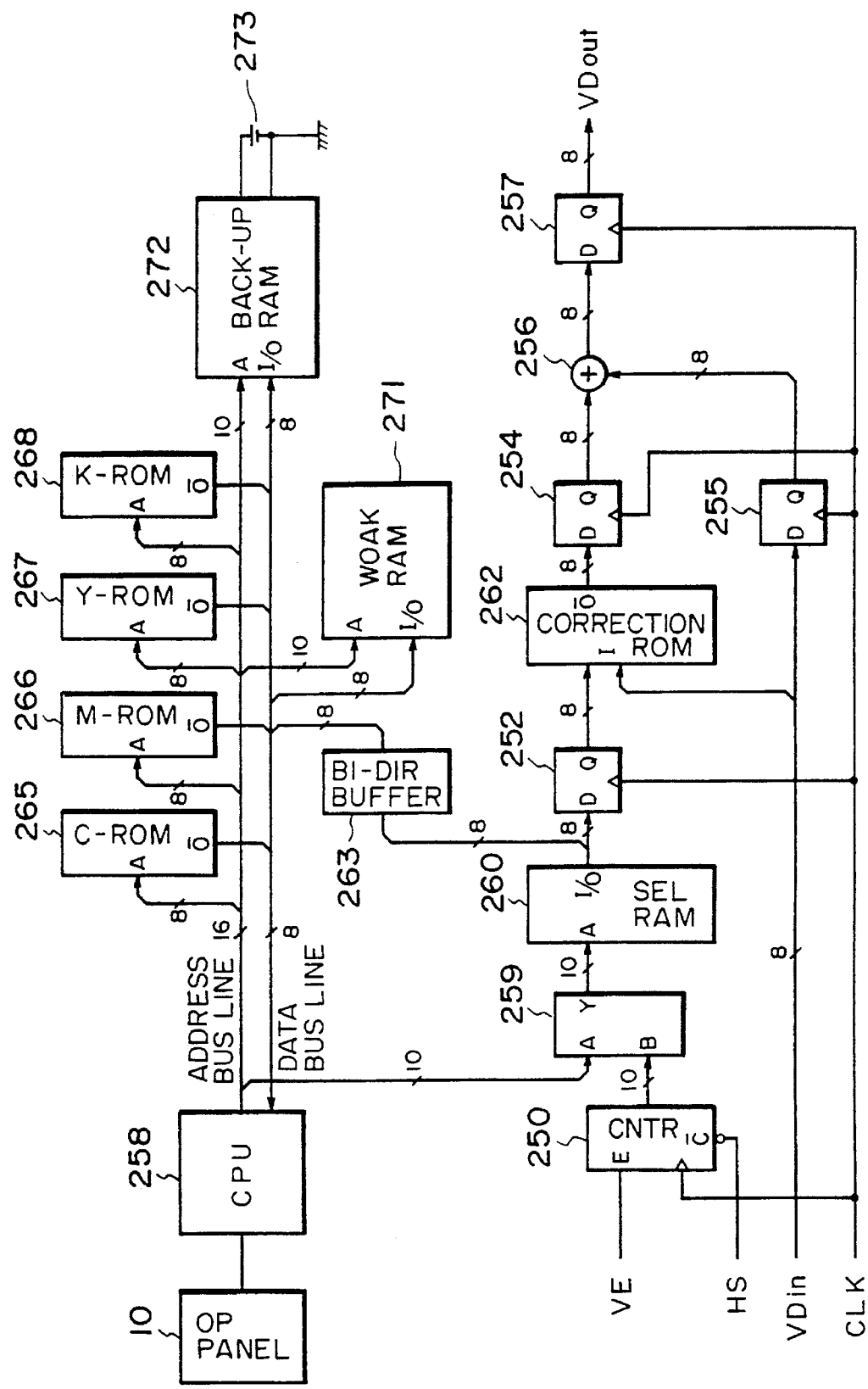
FIG. 8 is a circuit diagram of the system according to a first embodiment.

Referring to FIG. 8, the description will be made as to the head corrector 211. FIG. 8 is a block diagram of the head corrector 211 shown in FIG. 7. A counter 250 is an address counter for producing an address in a correction amount selecting table RAM 260 (which will hereinafter be called "selection RAM"). It is, in this embodiment, a counter constituted by 10 bits to count for 1024 nozzles (256 nozzles×4 colors). It is controlled by the signals HS and VE.

ROM 265–268 are characteristics storing ROM storing density non-uniformness characteristics for each of 256 nozzles in each of C, M, Y and Bk heads. Since each of the heads has 256 nozzles, the ROM stores data for correcting the density non-uniformness of the heads corresponding to the number of nozzles. As is well known in the art ROMS 265–268 may comprise semiconductor memory devices. Image data VTin contain digital image data including color component image data for each picture element sequentially, for example, C, M, Y, K, C, M, Y, K. Data is taken out from ROM 265–268 in accordance with the image data order to be inputted and are stored in the selection RAM 260. A bidirectional buffer 263 functions to write the data taken out from the ROM 265–268 in the RAM 260.

A selector 259 serves to select from the address data in the 16 bit address bus produced from the CPU 258 either of lower 10 bit or 10 bit output of the counter 250. When the data is to be written in the RAM 260, the selector 259 selects the output of the CPU 258, and when the data is to be read out from the RAM 260, the output of the counter 250 is selected.

The data produced by the RAM 260 is inputted into the address of the correcting table ROM (correcting ROM) 262 together with the image data VDin through a flip-flop circuit 252.

Figure 9:
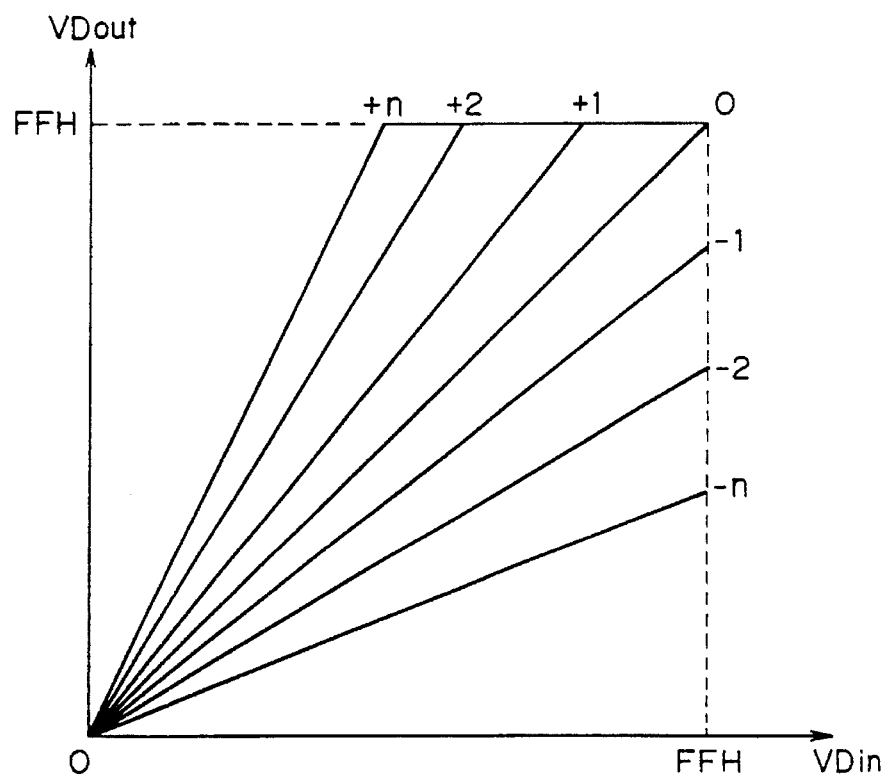
FIG. 9 shows a correcting table of a correcting ROM.

The ROM 262 contains a correcting table depicted by "1−n"–"1+n" in FIG. 9, beforehand.

FIG. 9 shows (2n+1) correcting tables. Actually however, approximately 61 correcting tables are enough with the increment with 1% and with the correction amount of ±30%. The table is written in the correcting ROM 262 such that correction data ΔA corresponding to the input A are produced. The correction datum ΔA is selected in accordance with the image signal VDin inputted in the address of the ROM 262 and the selection data. It is once latched by the flip-flop 254 and is added by the input data A by the adder 256, and is outputted as a corrected datum (A+ΔA) through the flip-flop circuit 256.

Working RAM 271 is used when the characteristic data from the characteristics storing ROM 265–268 is written in the RAM 260. A back-up RAM 272 functions to hold the data written in the selection RAM 260 and is always backed up by a battery 273. The RAM 271 and the back-up RAM 272 are used when the operator changes the head characteristics from those stored in the storing ROM 265–268 by operating the operation panel 10. The description will now be made as to the characteristics change.

Figure 10:
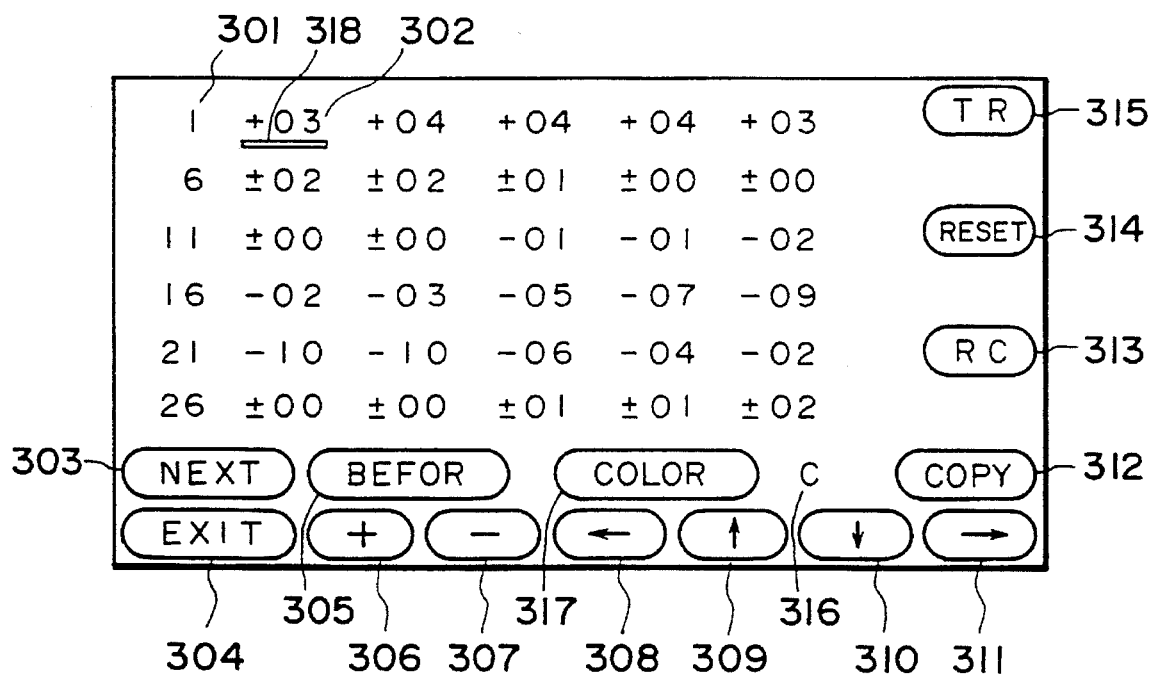
FIG. 10 shows a display of a liquid crystal touch panel in the operational panel in the first embodiment during the property changing mode.

Referring to FIG. 10, there is shown the portion of a liquid crystal touch panel display of the operation panel 10 which is used when the characteristics are to be changed.

When the characteristics changing mode is selected by a service mode switch (not shown) on the operation panel, the display of FIG. 10 appears in the liquid crystal touch panel in the operation panel. Reference numerals 316 designates the color of the head which is going to be subjected to the characteristics change; 301, a nozzle number in the head; and 302, the current correction data. In the Figure, the data for the nozzles 1–5 appear on the topmost line. In FIG. 10 it is shown that the first nozzle of the C (cyan) head is corrected by +3% (ΔA). As shown in FIG. 10, one display presents correction data for 30 nozzles for one color, and therefore, in order to change the correction data for the nozzles not on the display, the nozzles which are desired to be corrected are selected every 30 nozzles by roll-up key 303 or roll-down key 305, or otherwise the head for the desired color is selected by a color selection key 317. The control for the display is performed by the controller 111. When the correction data 302 on display as shown in FIG. 10 are corrected to be matched with the head characteristics by the operator, the display is selected using the roll-up key 303, the roll-down key 304 and the color selection key 317, and the cursor is moved to the position of the correction data corresponding to the head nozzle to be corrected. Next, an up key 307 or a down key 308 are pressed to increase or decrease the correction data on the cursor 318. In this embodiment, the correction data can be corrected with the increment of 1% in the range of ±30%.

Figure 12:
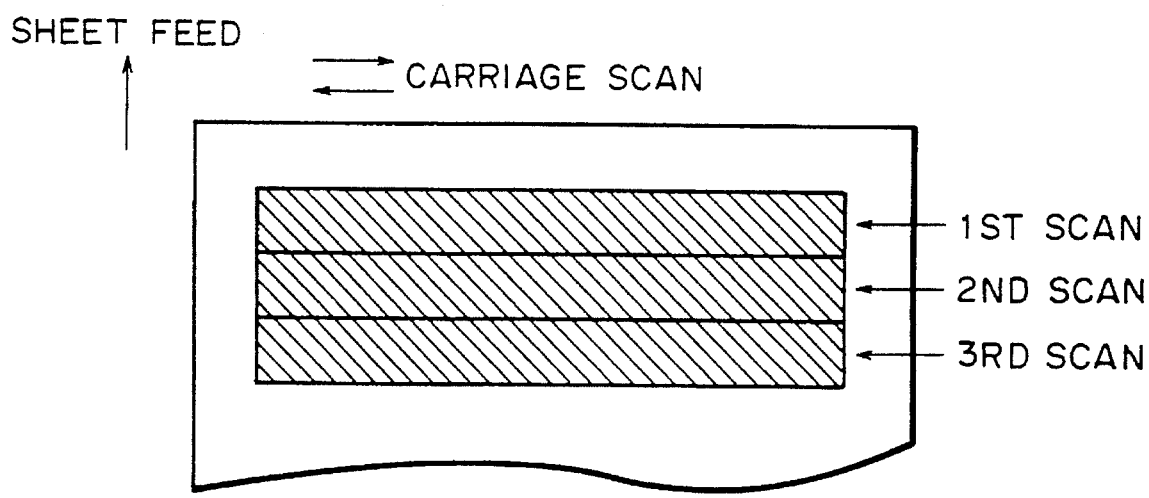
FIG. 12 illustrates a record pattern to be recorded by the recording head in accordance with the pattern signal.

After the required correction operation is carried out, the operator actuates the copy start key 312. Then, the pattern generator 130 shown in FIG. 5 produces a pattern signal which is recorded by one of the recording heads 117–120, as shown in FIG. 12. The operator discriminates as to whether or not the further correction is required. If so, the above-described operation is repeated to reach the proper correction data. When the further correction becomes unnecessary, a registration key 315 is depressed. In response to it, the CPU 258 registers the correction data in the back-up RAM 272.

The internal operation for the data correction will be described. Upon the main switch is actuated, the CPU 258 shown in FIG. 8 transfers to the working RAM 271 the data for 256 nozzles and four colors (C, M, Y, K) backed up by the back-up RAM 272. When the back-up RAM 272 is empty, that is, it is at the time of being dispatched from the plant, a characteristic resetting key 314 is actuated by which the data in the characteristics storing ROM 265–268 are developed in the working RAM 271 and the back-up RAM 272. Next, the correction data increased or decreased by the up and down keys 306 and 307 are supplied to the working RAM 271 only. The data in the working RAM 271 is transferred to the selection RAM 260 in response to the actuation of the copy start key 312 which is actuated by each of the test sampling operations. In accordance with the data, the above-described correction is made. When it comes to such a stage that the further correction is unnecessary, the registration key 315 is pressed, upon which the data in the working RAM 271 are transferred to the back-up RAM 272. These data are used as correction data until the next correction is made. A recall key 313 is used when the change of the correction data is not proper, and it is to be returned to the currently registered correction data. When it is pressed, the data in the back-up RAM 272 are transferred to the working RAM 271. All the changing operations are completed, an exit key 304 is pressed, upon which the characteristics changing mode is disabled. Thereafter, the normal copying operation is possible by pressing the copy start key.

Figure 11:
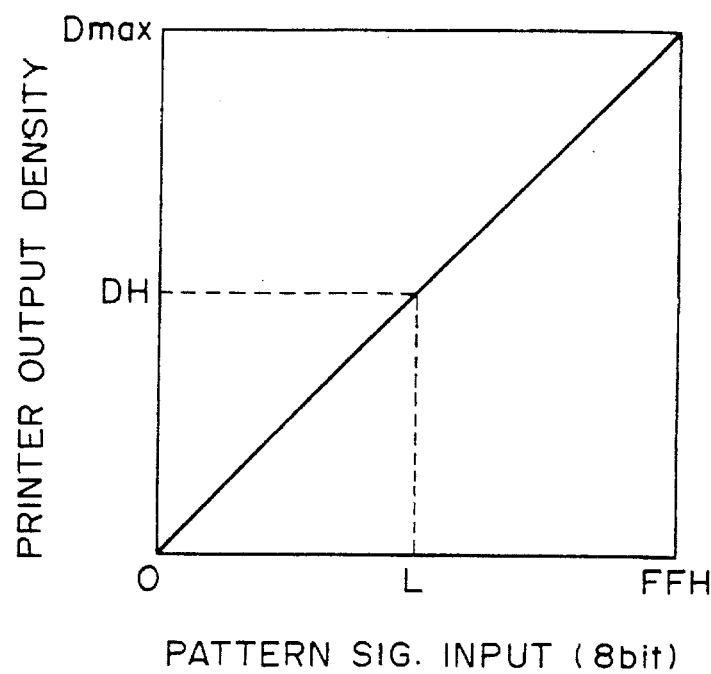
FIG. 11 shows a pattern signal produced by a pattern generator shown in FIG. 5.

Referring to FIGS. 11 and 12, the description will be made as to a test sample recorded in response to depression of the copy start key 312. When the copy start key 312 shown in FIG. 10 is selected, the pattern generator 130 shown in FIG. 5 produces a digitalized pattern signal having a level L. Thereafter, the pattern signal is supplied to the input image processor 101 and is transmitted to the recording heads 117,118,119 and 120 through the image processor 107, the binary code processor 108. A pattern having a constant record image density $D_H$ corresponding to the input image signal level L, as shown in FIG. 12. When the display is as shown in FIG. 10, the cyan (C) is selected, and therefore, when the operator selects the copy start key 312, the recording operation for the pattern is performed by the cyan head under the control by the controller 111.

The record pattern produced by the pattern generator 130 in this embodiment causes the recording head to perform three scanning record operations, as shown in FIG. 12. By the several scanning operations, the operator can easily discriminate the non-uniformness of the density attributable to the variation and change of the output characteristics of the recording head.

The digitalized pattern signal having the level L produced by the pattern generator 130 is supplied to the image processor 107, and is normally subjected to the black extraction, masking, UCR, γ and offset, smoothing, edge enhancing or the like processing. As a result, the signal levels supplied to the respective color recording heads are not always equal. It follows that the record image density levels are not uniform for the respective recording heads. In this embodiment, when the pattern recording operation is performed in response to the selection of the copy start key 312, the pattern signal L is not subjected to the masking, UCR, γ and offset, smoothing and edge enhancing or other image process, but it is transmitted to the binary code processor 108 without change, by which the pattern signals applied to the recording heads become uniform, and the record density levels of the record pattern provided by the recording heads are uniform. To do this, the controller 200 controls the UCR 205, the masking processor 202 or the like.

In this embodiment, there is provided a limiter for the correcting data ΔA in the display shown in FIG. 10. As shown in FIG. 9, the number of the correcting tables written in the correcting table ROM is limited, and the upper and lower limits for the amount of correction are predetermined. In addition, the correction data for the respective nozzles in the respective recording heads are already written in the ROM 265–268. Therefore, if the correctable amount range for the correction data ΔA while looking at the display shown in FIG. 10 is too large, the total correction data for the respective nozzles in the respective recording heads saturate to the upper or lower limit, with the result that the record density non-uniformness can actually not be corrected. In this embodiment, the variable range for the correction data ΔA on the display shown in FIG. 10 is limited within ±α%, so that the above-described problem can be avoided as much as possible. The inventors' experiments have revealed that the density non-uniformness of the recording heads can be sufficiently removed the upper and lower range (±α%) for the correction data ΔA are approximately ±20%.

Figure 13A:
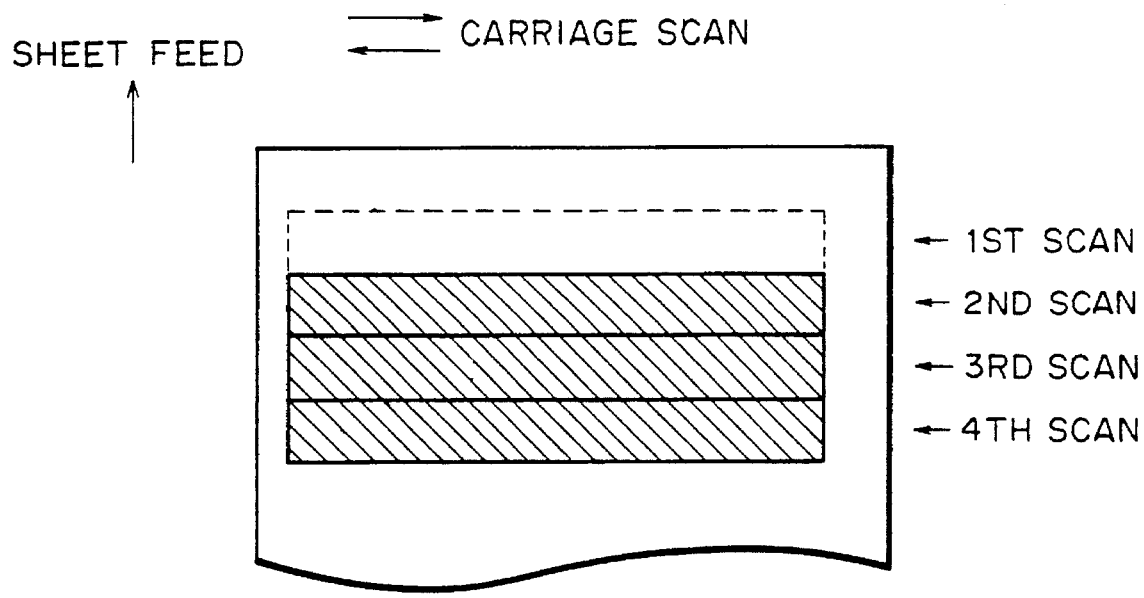
FIG. 13A shows a record pattern in a second embodiment.

FIG. 13A shows a second example of the pattern recording responsive to the copy start key 312 in the characteristics changing mode in the image forming apparatus according to this embodiment, wherein the recording operation is deliberately not carried out during the first scan of the pattern recording operation, but the pattern is recorded from the second scan. This is accomplished under the control of the controllers 121 and 111 shown in FIG. 5.

Figure 13B:
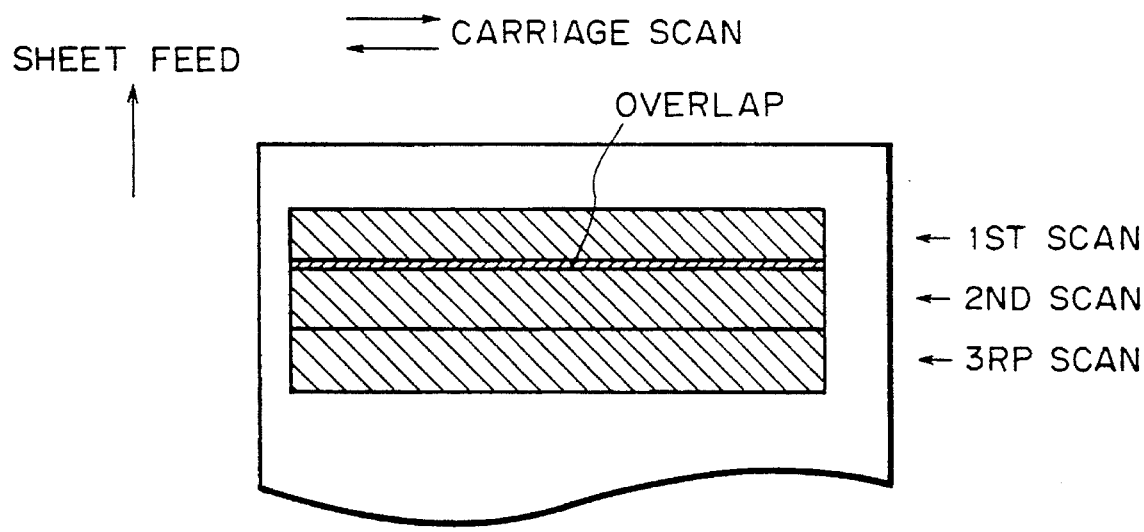
FIG. 13B illustrates a problem arising in the case of the record pattern shown in FIG. 12.

In the image forming apparatus of this embodiment, when the recording sheet is fed by the mechanism shown in FIG. 1 in order to record the pattern by the recording head, the amount of feed by the sheet feeding roller 28 is sometimes unstable at the initial stage of the sheet feeding after the recording sheet is supplied, due to the curling of the recording sheet or improper sheet conveyance. This may result in the overlapping of the first and second scans when the record pattern is recorded, as shown in FIG. 13B. This is not proper when the image non-uniformness by the recording head is discriminated by the operator.

As shown in FIG. 13A, in this example, after the recording sheet is supplied and becomes stably fed, the recording pattern is recorded by the recording head on the recording sheet, by which the above-described problem can be avoided.

Figure 14:
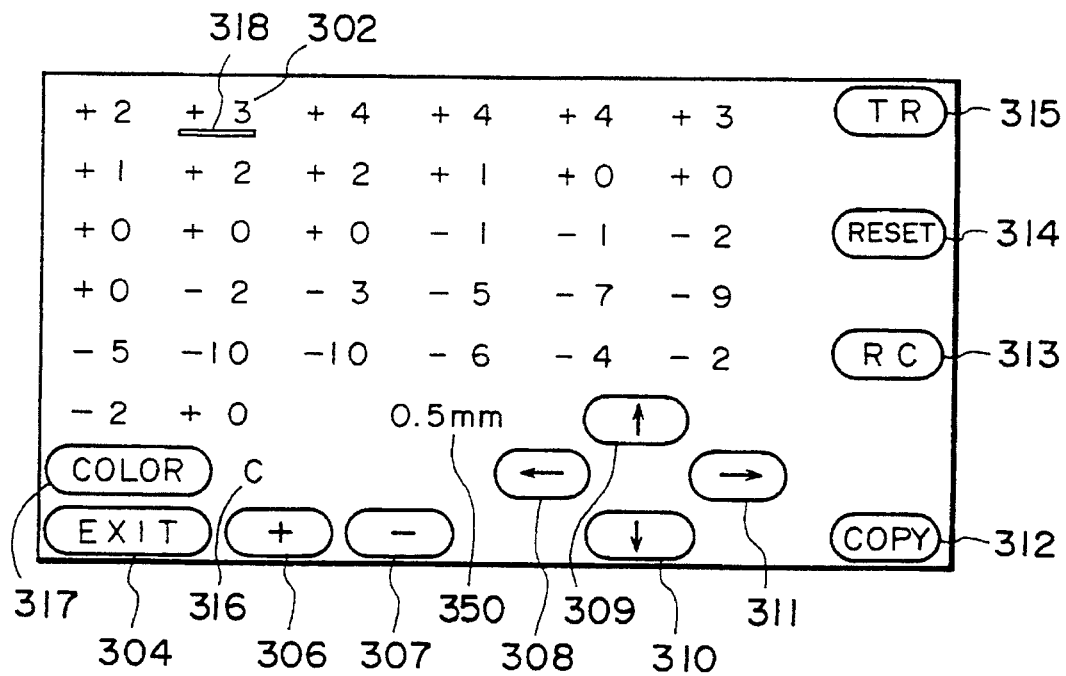
FIG. 14 shows a display of a liquid crystal touch panel of an operational panel according to a third embodiment, in a property changing mode.

FIG. 14 shows the display according to another example in the characteristics changing mode in the image forming apparatus, wherein in place of making corrections for the respective nozzles in the respective recording heads, a set of correction data for several nozzles provided by dividing the nozzles into groups at regular intervals is set, thus simplifying the correction data changing operation for the nozzles in the heads. In this embodiment the recording head having the recording capacity of 16 mm width with 256 nozzles and the resolution of 400 dpi. For such a head, the correction data can be changed for a set of 8 nozzles, that is, with 0.5 mm pitoh. In one display, all correction data for 256 nozzles (16 mm width) can be shown. In addition, the position of the divided area for which the correction data are to be corrected is displayed with dimension (numerical data indicated by reference numeral 350 in FIG. 14), thus further facilitating the correction operation. The divisional unit for the correction data of the recording head may be set in accordance with the number of nozzles and the resolution of the recording head. The inventors have confirmed visually that the image density non-uniformness of the recording head can be corrected to such an extent that it is practically no problem by correcting them for each 8 nozzles with 0.5 mm pitch for the recording head having 256 nozzles (resolution of 400 dip).

Figure 15:
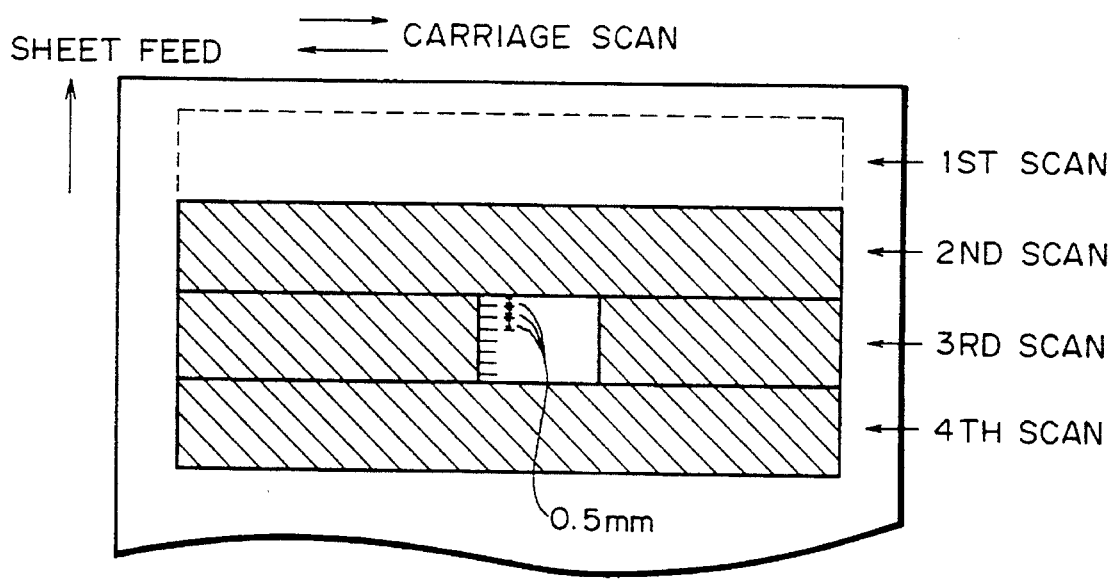
FIG. 15 shows a fourth example of the record pattern to be recorded by the recording head in the property changing mode.

FIG. 15 shows a further example of a record pattern of a test sample recorded in response to the copy start key 312 with the display of the above example, wherein the recording pattern contains non-record area. By the provision of the pattern empty portion, it is easily seen which position of the nozzle of the recording head corresponds to the area where the non-uniformness of the image density occurs. In this embodiment, only the nozzle corresponding to the boundary between the divided area in which the correction data is to be corrected performs recording operation in the empty portion of the pattern, by which a scale by the recorded dots are provided.

By providing the scale corresponding to the units of correction data provided by the equal division in the foregoing embodiment, the nozzle region of the recording head providing the density non-uniformness can be easily caught, so that the correction data changing operation using the display in the characteristics changing mode can be further simplified.

As described in the foregoing, in addition to the electric correcting means for correcting the variation in the output density of the recording head, there are provided means for displaying the correction data in the form of a liquid crystal touch panel in the operation panel, for example, means for changing the data and means for executing the recording operation in accordance with the changed correction data, whereby the density non-uniformness due to the time of use and using conditions can be compensated without exchanging the characteristics storing ROM or the recording head, so that the uniform image can be stably provided. In this embodiment, the image data are corrected in the sequence of colors, and therefore, it one circuit is enough without the necessity of providing the circuit for each of the colors. Therefore, inexpensive and high quality image forming apparatus can be provided.

Figure 16:
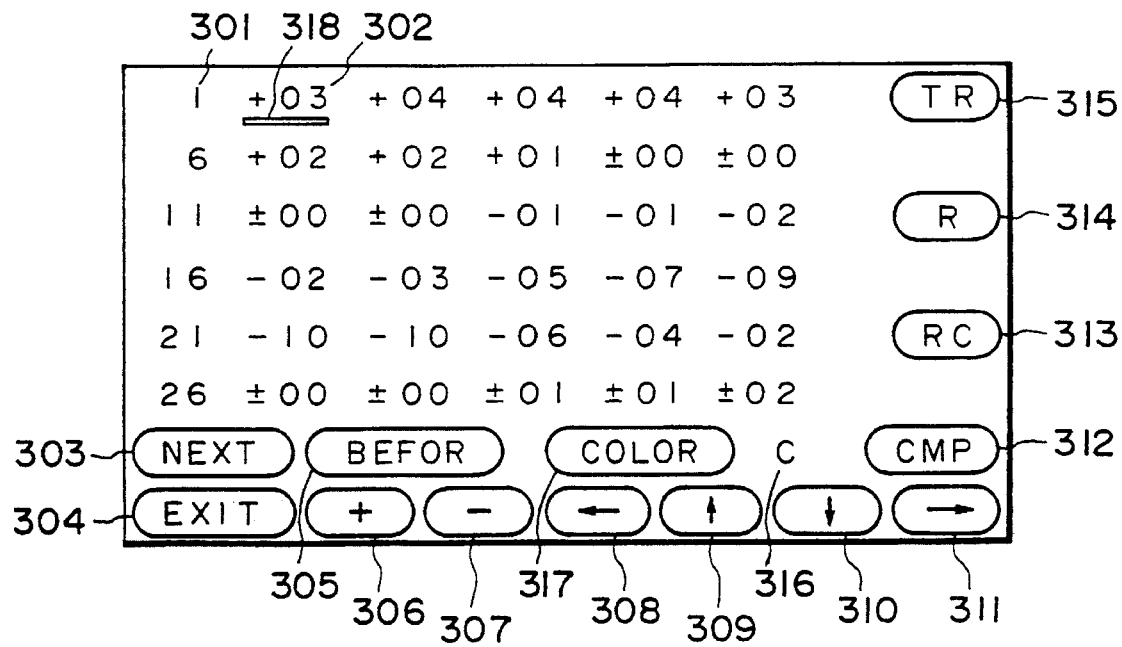
FIGS. 16 and 17 show other examples of the display shown in FIG. 10.
Figure 17:
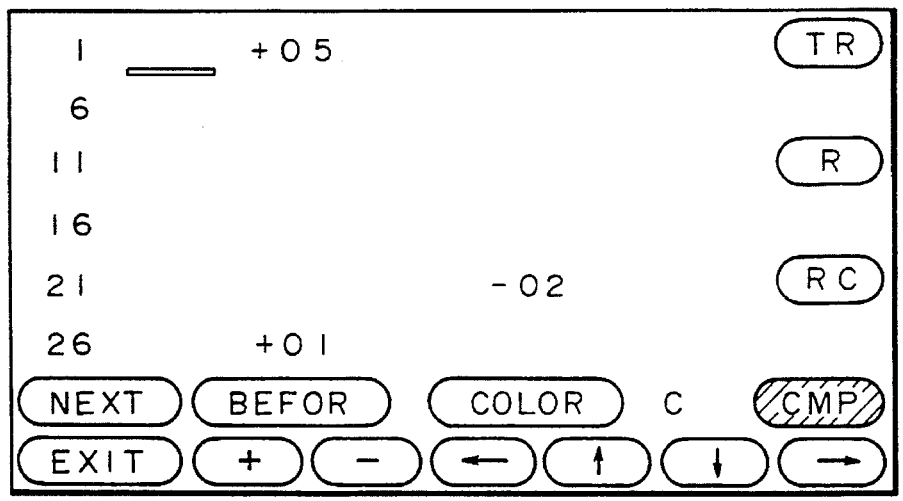

Referring to FIGS. 16 and 17, a further embodiment will be described. Since this embodiment is similar to FIG. 10 embodiment to some extent, and therefore, the description will be omitted by assigning the same reference numerals as in FIG. 10 to the elements having the corresponding functions for simplicity. The apparatus includes a comparison key (CMP) 312 to detect which nozzle of which head is changed. FIG. 17 shows a display when the comparison key 312 is pressed when FIG. 16 is on display. When it is depressed, the CPU 256 compares the correction data in the characteristics storing ROM 265–268 and the corresponding correction data stored in the working RAM 271 (or the backup RAM 272), and only the different parts are extracted and are displayed. In the example of FIG. 17, the display shows that the second, 24th and 27th nozzles of the C head are changed. At this time, the comparison key 312 is reversed. When the comparison key 312 is pressed with the display of FIG. 17, the display returns to FIG. 16. When the changing operation is completed, it is registered, and by depressing the exit key (EXIT) 304, the characteristics changing mode is disables. Thereafter, the normal copying operation can be started by depressing the copy start key.

[Another Embodiment]

Figure 18:
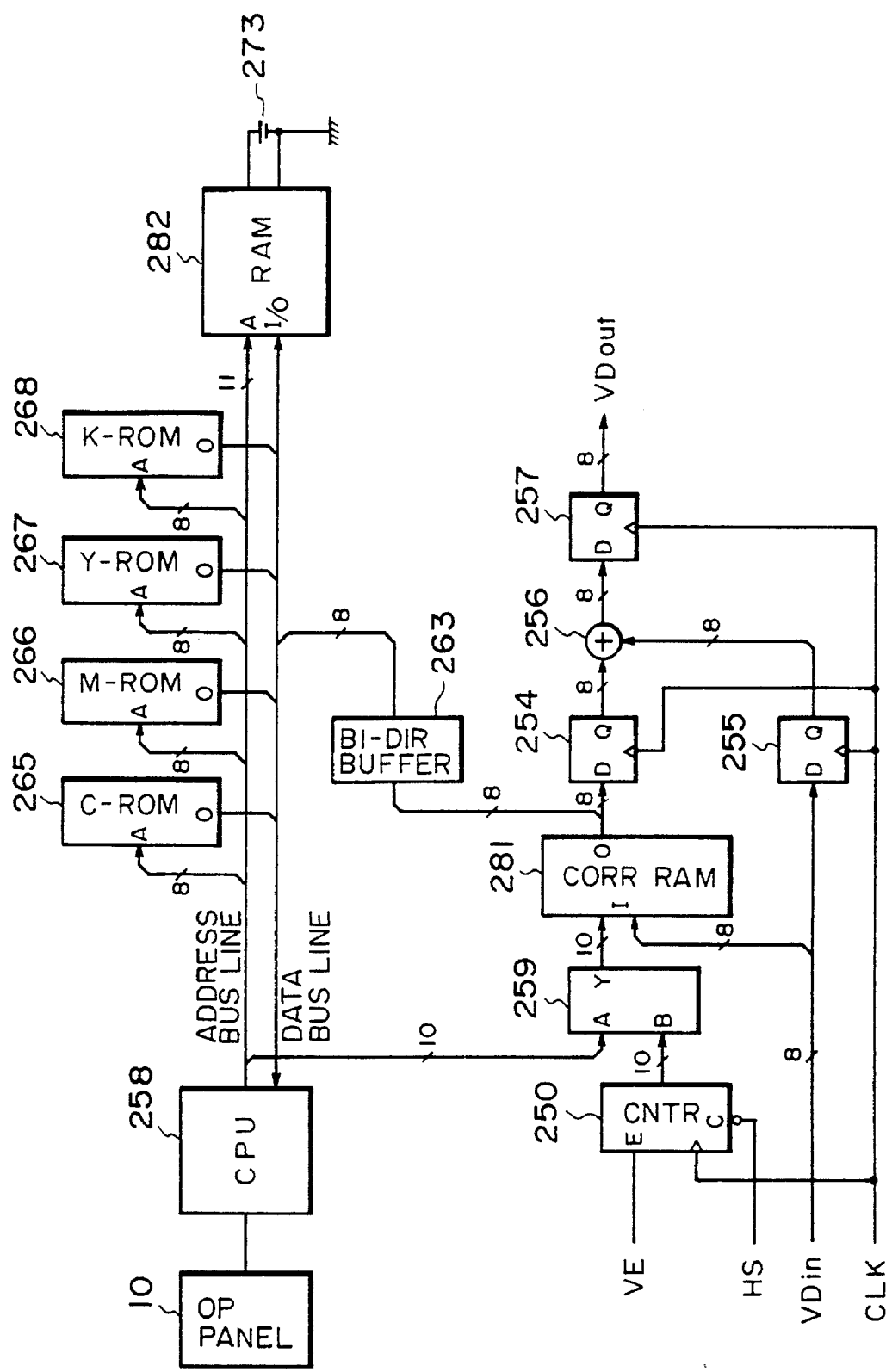
FIG. 18 is a block diagram which is a modification of FIG. 8 structure.

FIG. 18 is a block diagram of the recording head correcting portion 211 according to a further embodiment of the present invention. The same reference numerals as in FIG. 8 are assigned to the elements having the corresponding functions, and the detailed description thereof is omitted for simplicity. RAM 282 is a working RAM to be used when the correction data are to be corrected from the operation panel 10, and is backed up by a battery 273. The working RAM 282 has a capacity of 2048 bytes. The first half 1024 bytes are used for the working RAM, and the second half 1024 bites are used for the registration.

In the correction RAM 281, the correction data ΔA for the input A are written in synchronism with the input of the image data VDin color-sequentially (C, M, Y, K, for example) along the correction curve of FIG. 12, for each nozzle of each head.

The CPU 258, upon actuation of the main switch, transfers the data registered in the working RAM 282 to the working area. When the characteristics changing mode is selected, and the reset key 314 in the display shown in FIG. 2 is depressed, the correction data stored in the characteristics storing ROM 265–268 are transferred to the working area of the RAM 282. Thereafter, the CPU 258 selects an A-side of the selector 259, upon which the change ΔA is calculated on the basis of the data in the working area of the RAM 282, and the correction data is written in the correction RAM 281. Then, the copy start key is depressed so that the copy operation or the test printing operation is started, upon which the CPU 258 selects a B-side of the selector 259 to correct the image data.

In the circuits shown in FIGS. 8 and 18, the image density non-uniformness change due to the use time or the using conditions of the recording head can be compensated without replacing the characteristics storing ROM or the recording head, and therefore, uniform images can be stably provided.

Figure 19:
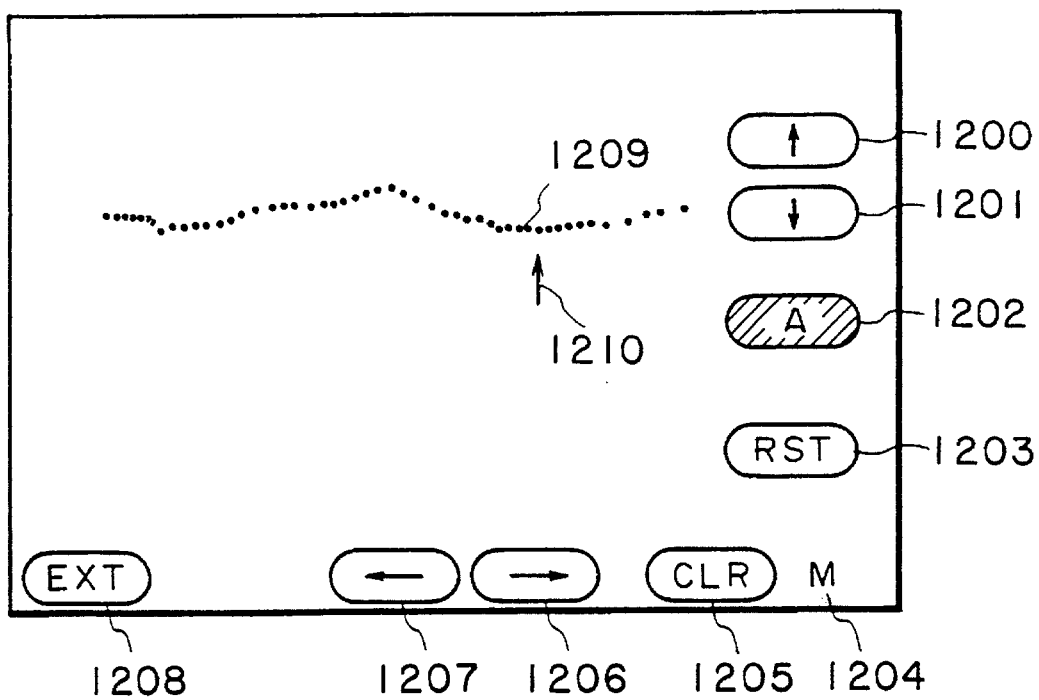
FIGS. 19 and 20 show further examples of the display of FIG. 10.
Figure 20:
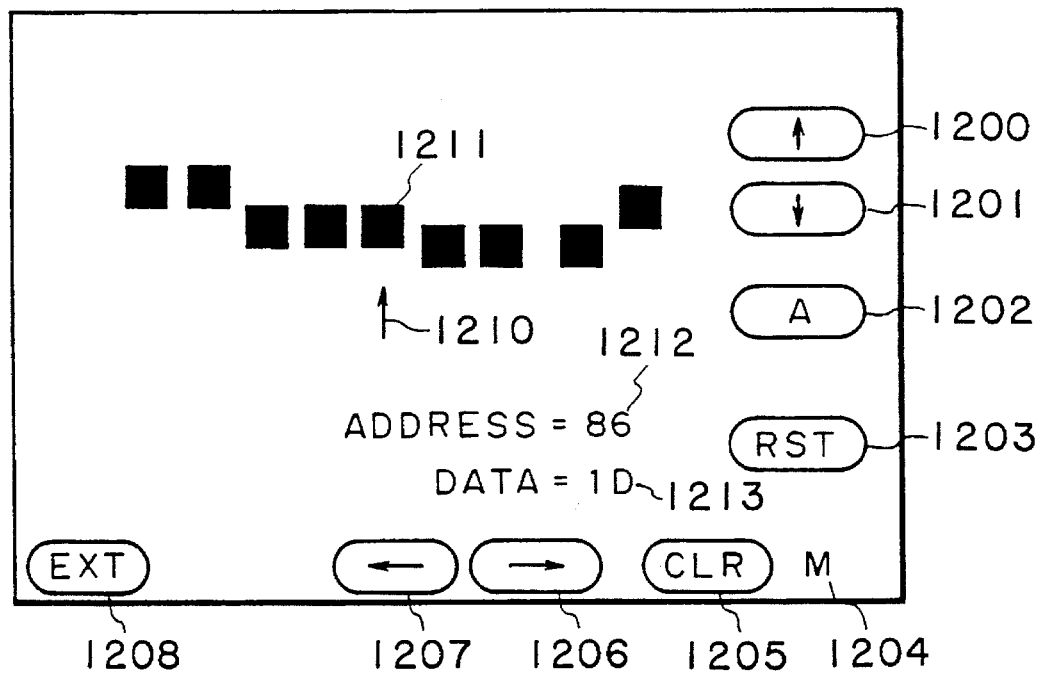
Figure 21:
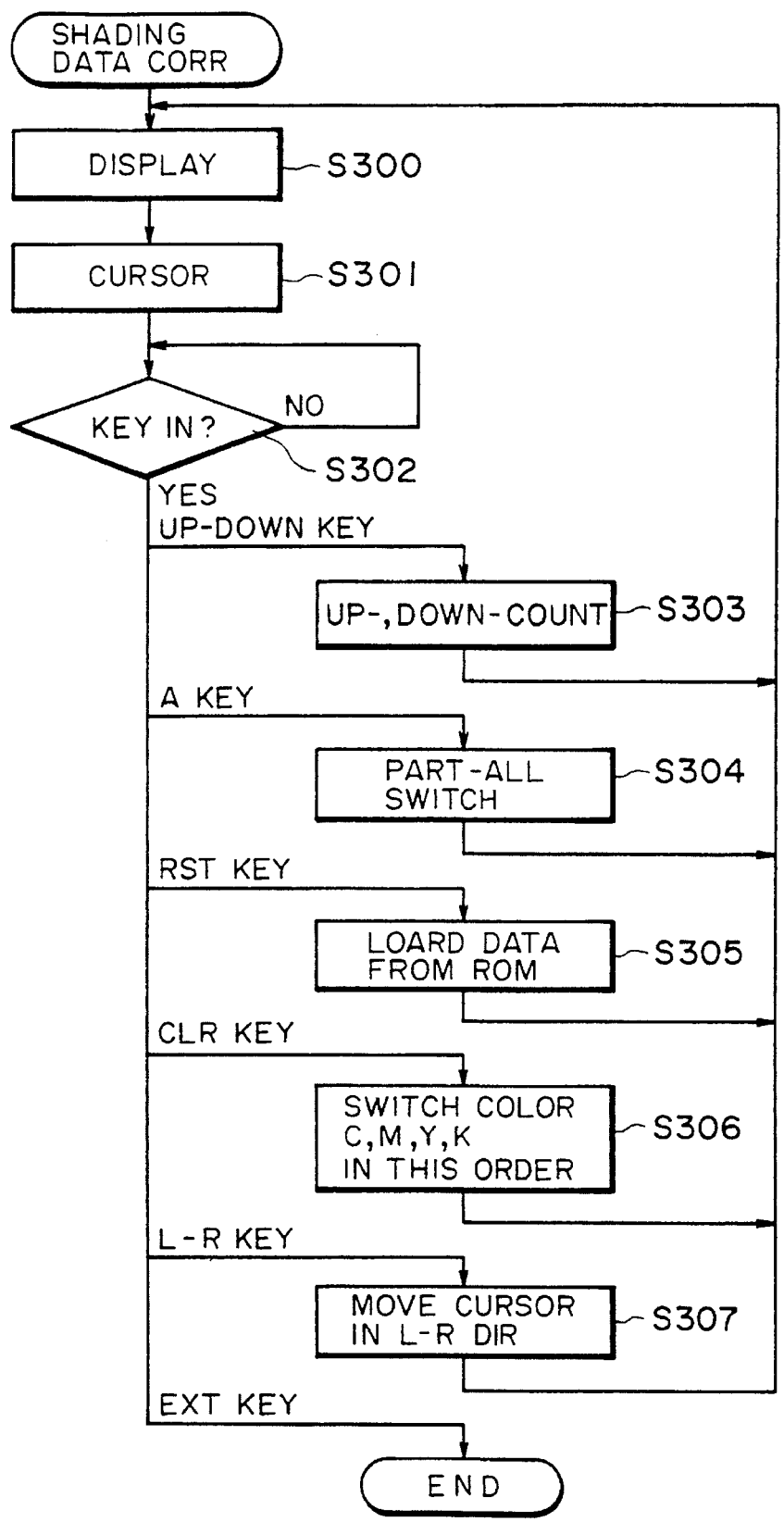
FIG. 21 is a flowchart illustrating a correcting operation.

Referring to FIGS. 19–21, a further example of the display will be explained.

FIGS. 19 and 20 illustrate the correction data changing operation, wherein FIG. 19 shows a display when the change of the correction data is instructed by an unshown key on the operation panel 10. The display appears on the liquid crystal touch panel (not shown) on the operation panel 10. In FIG. 19, a reference numeral 1209 designates the total display of the correction data, and the current correction data for the selected color are graphically displayed by dots corresponding to the array of the recording head nozzles. A cursor 1210 is at the correction datum (head nozzle) to be changed. A left key 1207 functions to move the cursor 1210 leftwardly. A right key 1206 is effective to move the cursor 1210 rightwardly. The operator designates the correction data to be changed by the keys 1206 and 1207. A color selection key (CLR) 1205 functions to select the color for which the correction data or datum is desired to the corrected. A display 1204 displays the currently designated color. Each time the color key 1205 is depressed, the color is changed in the order of cyan (C), magenta (M), yellow (Y) and black (K). A reset key (RST) 1203, when depressed, functions to transfer the correction data stored in the characteristics storing ROM 1265–1268 to the RAM 1271 and 1272. Then, the display of the current correction data becomes the original correction data. A display changing key (A) 1202 is effective to alternately exchanging the display between the total data display and the partial enlarged display which will be described hereinafter in conjunction with FIG. 20. The display changing key 1202 provides the partial enlarged display of FIG. 20 in unusual manner, but the display is reversed when the total data is displayed as in FIG. 19.

FIG. 20 shows the partial enlarged display of the correction data. In this Figure, a reference numeral 1211 designates a partial enlarged display of the correction data 1209, and four data are displayed in an enlarged scale with the correction data on the cursor 1210 located at the center. A column 1212 is an address display (or nozzle number) of the correction datum on the cursor 1210, and a column 1213 displays numerically the correction datum (hexa-display, for example). An up key 1200 functions to increment by a predetermined amount the correction datum on the cursor 1210 each time it is pressed. A down key 1201 functions to decrement by the predetermined amount the correction data each time it is pressed. These keys 1200 and 1201 may be used in the display of FIG. 19. In this manner, the display is changed, and the correction data are changed. An exit key (EXT) 1208 functions to complete the display and changing mode for the correction data.

FIG. 21 is a flowchart illustrating the control operation of the CPU when the correction data are changed. At step S300, the display shown in FIG. 19 is provided. At step S301, the cursor 1210 is provided. At step S302, the key input from the operation panel 10 is awaited, and as soon as the key input is made, the processing in accordance with the key input is performed. More particularly, when the up/down key 1200/1201 is pressed, step S303 is executed to increment or decrement the correction data. When the display changing key 1202 is pressed, a step S304 is executed by which the total display and the partial enlarged display are alternately exchanged. When the reset key 1203 is pressed, a step S305 is performed, which the original correction data are read out of the characteristics storing ROM (FIG. 8) for the selected color and are written in the working RAM 271 and the back-up RAM 272 at the corresponding areas, and the display is renewed. When the color key 1205 is depressed, a step S306 is executed, upon which the color designation is changed, and the correction data and the color are renewed. When the left/right key 1206/1207 is pressed, a step S307 is performed, by which the cursor 1210 is moved to left/right. When the end key 1208 is pressed, the processing is completed, and the display returns to normal state (not shown).

In the foregoing embodiment, the correction data are changed for each nozzle. This is not limiting. When the resolution of human eyes is considered, it may be sometimes better that the density change is made in a certain relatively wide area. By doing so, the changing operation can be saved. From this standpoint, in the partial enlarged display, the graphic display may be made on the basis of the average of plural data, and the incrementing or decrementing operation may be carried out to change the average level.

When the display is returned to the total data display from the partial enlarged display, the plural data may be displayed with the state wherein the change is distributed corresponding to the differences from the average of the portion incremented or decremented.

It is a possible alternative that when the correction datum of a nozzle is incremented or decremented, several front side and/or rear side nozzles may be incremented or decremented together in a certain range (for example, with the weight reversely proportional to the distances from the nozzle). By doing so, the correction data provides a smooth curve, thus preventing too steep change.

In the embodiments shown in FIGS. 10, 16, 17, 19 and 20, the correction data are changed on the basis of the operators discrimination. This is not limiting. For example, several groups of correction data (or changing algorithm) are prepared beforehand in consideration of the changes in the output characteristics depending on the ambient condition changes and the changes with use of time, and the operator can select one of them. The several groups of correction data are determined by collecting in various load test and time test in the manufacturing plant and statistically processing the corrected data. By doing so, the operator which is not familiar with the analysis of the density change can easily correct the image density.

Another alternative is that memory is added for the information of one image, and on the other hand, a test pattern image which is easy in discriminating the density non-uniformness is printed. Then, the printed test pattern image is read by the scanner, and the read image is stored in the added memory. The image information and the test pattern image information are compared, and in accordance with the result of comparison, the correction data may be automatically performed.

In the foregoing embodiments, the display 19 covers only one color. It is, however, possible, the data for plural colors may be simultaneously displayed. Then, the comparison by the operator on the graphic display is easier, and the discrimination of the cause or causes for the non-uniformness.

In the foregoing embodiments, the description has been made with respect to an ink jet recording process, and therefore the example of the head has plural nozzles for ejecting ink. However, the present invention is not limited to the apparatus having the nozzles for the ink ejection as in the ink jet recording type, but it is applicable to another head having a plurality of dot recording elements, such as a thermal transfer recording process using plural heat generating elements for applying heat for the recording.

In the foregoing embodiments, when the recording conditions of the dot recording elements are changed, the image datum to each of the recording element is corrected. The present invention is not limited to this. For example, the electric energy to the recording element can be changed. In a type of the ink jet recording apparatus wherein the ink is ejected using air pressure and electrostatic force, for example, one or both of the air pressure and the electric static force may be corrected to change the recording condition of each of the dot recording element. The method of correction may be changed in accordance with the recording type of the image forming head.

As described in the foregoing, according to the embodiment of the present invention, in addition to the electric correcting means for correcting the variation of the output image density of the recording head, there are provided means for displaying the correction data, means for changing the data, and means for executing the recording operation with the recording head in accordance with the correction data after changed. Therefore, even if the variation of the density of the recording head changes, the change in the density distribution can be compensated without difficulty, and therefore, uniform images can be stably provided.

According to the embodiment, even if the output characteristics of the recording element changes, it can be compensated without difficulty.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus comprising:

(a) an image forming head having a plurality of recording elements arranged with non-uniformity therebetween, said image forming head being drivable by a driving signal so as to form a predetermined pattern image;

(b) correcting means for correcting the non-uniformity between the plurality of recording elements using plural correcting conditions;

(c) display means for numerically displaying the plural correcting conditions for the plurality of recording elements, the plural correcting conditions being displayed simultaneously so that a user of said image forming apparatus can visually compare the plural correcting conditions;

(d) changing means for changing the plural correcting conditions;

(e) control means for controlling the image forming head to form the predetermined pattern image based upon the plural correcting conditions changed by said changing means; and (f) means for generating a controlling signal for said display means to control said display means to display the plural correcting conditions changed by said changing means.

2. An apparatus according to claim 1, wherein the plural correcting conditions are used to correct image data supplied to the plurality of recording elements.

3. An apparatus according to claim 1, wherein said control means controls said image forming head to form the predetermined pattern image based on predetermined image data input to said image forming head, the predetermined image data having a predetermined image density.

4. An apparatus according to claim 1, wherein said control means controls formation of the predetermined pattern image after a recording sheet conveyance is stabilized.

5. An apparatus according to claim 1, wherein the plural correcting conditions comprise correcting conditions for each of the plurality of recording elements.

6. An apparatus according to claim 1, wherein the plurality of recording elements are arranged in groups; and wherein the plural correcting conditions comprise correcting conditions for each group of the plurality of recording elements.

7. An apparatus according to claim 1, wherein the plurality of recording elements eject liquid droplets.

8. An apparatus according to claim 7, wherein the plurality of recording elements generate thermal energy to eject the liquid droplets.

9. An image forming apparatus having plural recording elements, said image forming apparatus comprising:

(a) memory means for storing plural correction data corresponding to output characteristics of the plural recording elements, the plural correction data for reducing non-uniformity in the plural recording elements;

(b) inputting means for inputting image data from which the plural recording elements form an image;

(c) correcting means for correcting the image data input by said inputting means using the plural correction data stored in said memory means;

(d) display means for numerically displaying the plural correction data stored in said memory means, said display means also displaying difference information relating to a difference in correction between the plural correction data;

(e) changing means for changing the plural correction data displayed by said display means; and (f) means for generating a driving signal for driving said display means in accordance with a state of said correcting means.

10. An apparatus according to claim 9 wherein said memory means includes first memory means for storing initial correction data for the plural recording elements, second memory means for storing correction data changed by said changing means, and third memory means for storing the correction data from the second memory means.

11. An apparatus according to claim 10, further comprising:

(g) instruction inputting means for inputting an instruction to transfer the correction data from the second memory means to the third memory means.

12. An apparatus according to claim 10, further comprising:

(g) instruction inputting means for inputting an instruction to transfer the correction data from the first memory means to the third memory means.

13. An apparatus according to claim 10, further comprising:

(g) instruction inputting means for inputting an instruction to transfer the correction data from the first memory means to the second memory means.

14. An apparatus according to claim 10, further comprising comparing means for comparing a content of the first memory means to a content of the second memory means;

wherein said display means displays the plural correction data only when the comparing means determines that the content of the first memory means and the content of the second memory means are unequal.

15. An apparatus according to claim 9, further comprising display control means for terminating a display of the plural correction data by said display means in accordance with an input second instruction which is different from the input first instruction; and recording control means for recording a predetermined reference image in response to an input third instruction in a case where the plural correction data is displayed by said display means, and for performing a normal image recording operation in response to the input third instruction in a case where the plural correction data is not displayed by said display means.

16. An apparatus according to claim 9, wherein the plural correction data is supplied for each of the plural recording elements.

17. An apparatus according to claim 9, wherein the plural recording elements are arranged into groups; and wherein the plural correction data displayed by said display means comprises correction data for each group of the plural recording elements.

18. An apparatus according to claim 9, wherein the plural recording elements eject liquid droplets.

19. An apparatus according to claim 18, wherein the plural recording elements generate thermal energy to eject the liquid droplets.

20. An apparatus comprising:

(a) a color image forming head having a plurality of recording elements arranged with non-uniformity therebetween, said color image forming head being drivable by a driving signal so as to form a predetermined pattern image;

(b) correcting means for correcting a non-uniformity between the plurality of recording elements using plural correcting conditions;

(c) changing means for manually changing a correcting condition for one of the plurality of recording elements to reduce the non-uniformity in the plurality of recording elements; and (d) display means for numerically displaying the plural correcting conditions for the plurality of recording elements, the plural correcting conditions being displayed simultaneously so that a user of said apparatus can visually compare the plural correcting conditions.

21. An apparatus according to claim 20, wherein the plural correcting conditions correct image data supplied to the plurality of recording elements.

22. An apparatus according to claim 20, wherein the plural correcting conditions comprise a correcting condition for each of the plurality of recording elements.

23. An apparatus according to claim 20, wherein the plurality of recording elements are arranged into groups, with each group for recording one color component of plural color components which form color images; and wherein the plural correcting conditions comprise correcting conditions for each group in the plurality of recording elements.

24. An apparatus according to claim 20, wherein the plurality of recording elements eject liquid droplets.

25. An apparatus according to claim 24, wherein the plurality of recording elements generate thermal energy to eject the liquid droplets.

26. An image forming apparatus comprising:

(a) an image recording head having a plurality of recording elements disposed in groups;

(b) memory means for storing correction data corresponding to output characteristics of the plurality of recording elements;

(c) inputting means for inputting image data from which an image is to be formed;

(d) correcting means for correcting the image data input by said inputting means using the correction data stored in said memory means; and (e) display means for providing a graphic display of the correction data for the plurality of recording elements so that a user of said image forming apparatus can compare correction data for the plurality of recording elements.

27. An apparatus according to claim 26, wherein said display means displays a part of the graphic display in an enlarged scale in accordance with an input second instruction.

28. An apparatus according to claim 27, wherein the plurality of recording elements comprise plural recording heads which correspond to a number of color components; and wherein said display means provides a graphic display of correction data for one of the plural recording heads in response to an input third instruction.

29. A method for correcting a non-uniformity in a printing operation performed by plural recording elements arranged in a column, said method comprising the steps of:

printing a predetermined pattern based on an input signal using the plural recording elements;

determining a non-uniformity in the predetermined pattern printed in said step of printing; and correcting the input signal in accordance with the non-uniformity determined in said step of determining;

wherein the predetermined pattern includes plural rows, the plural rows including a constant density row having upper and lower borders, the constant density row being adjacent to other rows in the plural rows on the upper and lower borders;

wherein the plural recording elements print the predetermined pattern by scanning in a direction of the plural rows; and wherein, in the determining step, the non-uniformity is determined using a density of the constant density row irrespective of densities of other rows in the predetermined pattern.

30. A method according to claim 29, wherein the plural recording elements eject droplets of liquid; and wherein the plural recording elements generate thermal energy to eject droplets of the liquid.

31. A method according to claim 29, wherein the plural recording elements are disposed in a plurality of groups, each of the plurality of groups corresponding to one of several different color components.

32. A method according to claim 31, wherein the several different color components comprise cyan, magenta and yellow.

33. A method according to claim 29, wherein said step of determining is performed manually.

34. A method according to claim 29, further comprising the step of binarizing the input signal.

* * * * *

UNITED STATES PATENT AND TRADEMARK OFFICE
CERTIFICATE OF CORRECTION

PATENT NO. : 5,610,639

DATED : March 11, 1997

INVENTORS : Takada et al.

It is certified that error appears in the above-identified patent and that said Letters Patent is hereby corrected as shown below:

IN THE DRAWINGS:

Sheet 4, "N" (118) should read --M--, and "R" (120) should read --BK--.

COLUMN 5:

Line 40, "plate" should be --placed--;
Line 46, "leading" should read --reading--; and
Line 67, ". Color" should read --, color--.

COLUMN 8:

Line 41, "Y" should read --$\gamma$--; and
Line 50, "subsequently" should read --subsequent--.

COLUMN 9:

Line 53, "256" should read --257--.

COLUMN 10:

Line 19, "key 304" should read --key 305--.

UNITED STATES PATENT AND TRADEMARK OFFICE
CERTIFICATE OF CORRECTION

PATENT NO. : 5,610,639

DATED : March 11, 1997

INVENTORS : Takada et al.

It is certified that error appears in the above-identified patent and that said Letters Patent is hereby corrected as shown below:

COLUMN 11:

Line 8, "L, as" should read --L is--; and
Line 56, "removed the" should read --removed in the--.

COLUMN 12:

Line 26, "pitoh" should read --pitch.--.

COLUMN 13:

Line 4, "it" should be deleted; and
Line 40, "bites" should read --bytes--.

COLUMN 14

Line 25, "exchanging" should read --exchange--; and
Line 60, "which" should read --in which--.

UNITED STATES PATENT AND TRADEMARK OFFICE
CERTIFICATE OF CORRECTION

PATENT NO. : 5,610,639

DATED : March 11, 1997

INVENTORS : Takada et al.

It is certified that error appears in the above-identified patent and that said Letters Patent is hereby corrected as shown below:

COLUMN 16:

Line 12, "changed." should read --being changed.--.

Signed and Sealed this

Seventh Day of October, 1997

Attest:

BRUCE LEHMAN

Attesting Officer

Commissioner of Patents and Trademarks